(12) United States Patent
Raju

(10) Patent No.: US 10,679,305 B2
(45) Date of Patent: Jun. 9, 2020

(54) REAL TIME DIGITAL VALUE NODES AND NETWORKS

(71) Applicant: Kanumuru Rahul Raju, Telangana (IN)

(72) Inventor: Kanumuru Rahul Raju, Telangana (IN)

( * ) Notice: Subject to any disclaimer, the term of this patent is extended or adjusted under 35 U.S.C. 154(b) by 639 days.

(21) Appl. No.: 15/288,357

(22) Filed: Oct. 7, 2016

(65) Prior Publication Data

US 2017/0103470 A1 Apr. 13, 2017

(30) Foreign Application Priority Data

Oct. 8, 2015 (IN) .......................... 4545/CHE/2015

(51) Int. Cl.
| | |
|---|---|
| *G06Q 30/00* | (2012.01) |
| *G06Q 50/00* | (2012.01) |
| *H04L 29/08* | (2006.01) |
| *G06Q 10/08* | (2012.01) |
| *G06Q 20/38* | (2012.01) |
| *G06Q 30/06* | (2012.01) |

(52) U.S. Cl.
CPC ........... *G06Q 50/01* (2013.01); *G06Q 10/087* (2013.01); *G06Q 20/382* (2013.01); *G06Q 30/0611* (2013.01); *G06Q 30/0635* (2013.01); *H04L 67/10* (2013.01); *H04L 67/20* (2013.01)

(58) Field of Classification Search
CPC .................................................... G06Q 50/01
See application file for complete search history.

(56) References Cited

U.S. PATENT DOCUMENTS

| | | | | |
|---|---|---|---|---|
| 2006/0200741 A1* | 9/2006 | DeMesa | ................ | G06Q 10/06 715/205 |
| 2007/0288602 A1* | 12/2007 | Sundaresan | ............ | G06Q 30/06 709/219 |
| 2009/0198562 A1* | 8/2009 | Wiesinger | .............. | G06Q 30/02 705/35 |

OTHER PUBLICATIONS

Sun, R. (2011). Using social media intelligence to support business knowledge discovery and decision making (Order No. 3450767). Available from ProQuest Dissertations & Theses Global. (865891781). Retrieved from https://search.proquest.com/docview/865891781?accountid=14753.*

* cited by examiner

*Primary Examiner* — Kathleen Palavecino
(74) *Attorney, Agent, or Firm* — Ohlandt, Greeley, Ruggiero & Perle, LLP

(57) ABSTRACT

A system and method of enabling creation and management of a real time digital value network. Nodes are created, each node representing a user and a digital value network is then created based on the nodes thus created. The digital value network comprises a nodes and plurality of connections and real time interactions, each connection connecting one or more nodes based on a user profile of the user and a plurality of values associated with the one or more nodes. Thus, the VNNMS provides online support to customers or buyers and sellers in a real-time shared environment and enables value creation, optimization and value delivery. End-to-end approach delivers guaranteed realized savings to group of customers forming the network. The network of customers can be managed and expanded globally.

23 Claims, 45 Drawing Sheets

REAL TIME DIGITAL VALUE NODES AND NETWORKS

BACKGROUND

1. Field of the Disclosure

The present subject matter is related, to value networks in general and more particularly, but not exclusively related to a system and method of creation and management of a real time digital value nodes and networks.

2. Discussion of the Background Art

Computers increasingly serve as tools through which people interact and communicate with each other. As a result, many types of networks have developed to facilitate communication, transaction and interaction. Such network types include, for example, social networks, business networks, education networks, commerce networks, political networks, and so forth. A value network is a complex set of social and commercial relationships. Value networks exhibit interdependence. Value networks work via relationships to offer, seek, create and/or transact social goods (public goods) or economic goods (commercial goods). Value is created through exchange and the relationships between roles and takes the form of knowledge, other intangibles and or tangibles. Value networks account for the overall worth of products and services. Value networks operate in public agencies, civil society, in the enterprise, institutional settings, and all forms of organization. Value networks advance innovation, wealth, social good and environmental well-being.

Physical networks exist for commercial goods across industries, functions and so on. Individual companies have both internal and external value networks. External facing networks include customers or recipients, intermediaries, stakeholders, complementary, open innovation networks, suppliers etc. Internal value networks focus on key activities, processes and relationships that cut across internal boundaries, such as order fulfilment, innovation, lead processing, or customer support. Digital products like CRM (Customer Relationship Management), ERP (Enterprise Resource Planning), SCM (Supply Chain Management), Productivity tools (like word processing, spread sheets, email etc.) and corporate social networking tools exist and are being improved constantly to address the needs of the enterprise and few other forms of organization.

Though different kinds of offerings exist both in free and paid, in digital, soft and physical forms, they do not use the full potential of what's possible using information technology, connectivity (like Internet) and crowd sourcing in advancing innovation, efficiency, wealth, social goods and environment and social well-being across individuals, groups, companies, other forms or organization, public agencies, government and civil society. Hence, there exists a need for an improved system and method that enables creation and management of real time digital value networks.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a computer system to facilitate creation and management of a real time digital value nodes and networks. The system comprises a node creation and management module, a value network creation and management module and a dealer module. The node creation and management module is configured to create one or more nodes, each node representing a user and comprises at least a user profile and a plurality of values associated with the user. The value network creation and management module is configured to create a real time digital value network by generating a plurality of real time interactions and connections, each connecting one or more nodes. Each node to be connected with other nodes and interactions is determined based on at least the user profile and the corresponding plurality of values of the one or more nodes. The dealer module is configured to allow external users to create, verify, edit and modify the user profile and the plurality of values of the users. The dealer module is further configured to enable external users to create, verify, edit and modify the one or more nodes, enables the plurality of real time interactions and connections for the one or more nodes. The system further comprises a digital value node and network management module configured to enable view, and manage the one or more nodes, the plurality of real time interactions and connections of the one or more nodes.

Further, the present disclosure relates to a method for facilitating creation and management of a real time digital value nodes and networks. The method comprising one or more steps including creating one or more nodes each node representing a user and comprises at least a user profile and a plurality of values associated with the user. The method further comprises creating a real time digital value network by generating a plurality of real time interactions and connections. Each of the connections connect one or more nodes, wherein the node to be connected with other nodes and interactions is based on at least the user profile and the corresponding plurality of values of the one or more nodes. The method furthermore comprises allowing external users to create, verify, edit and modify the user profile and the plurality of values of the users, and to enable actions like post, order, transact, and manage the plurality of real time interactions and connections for the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
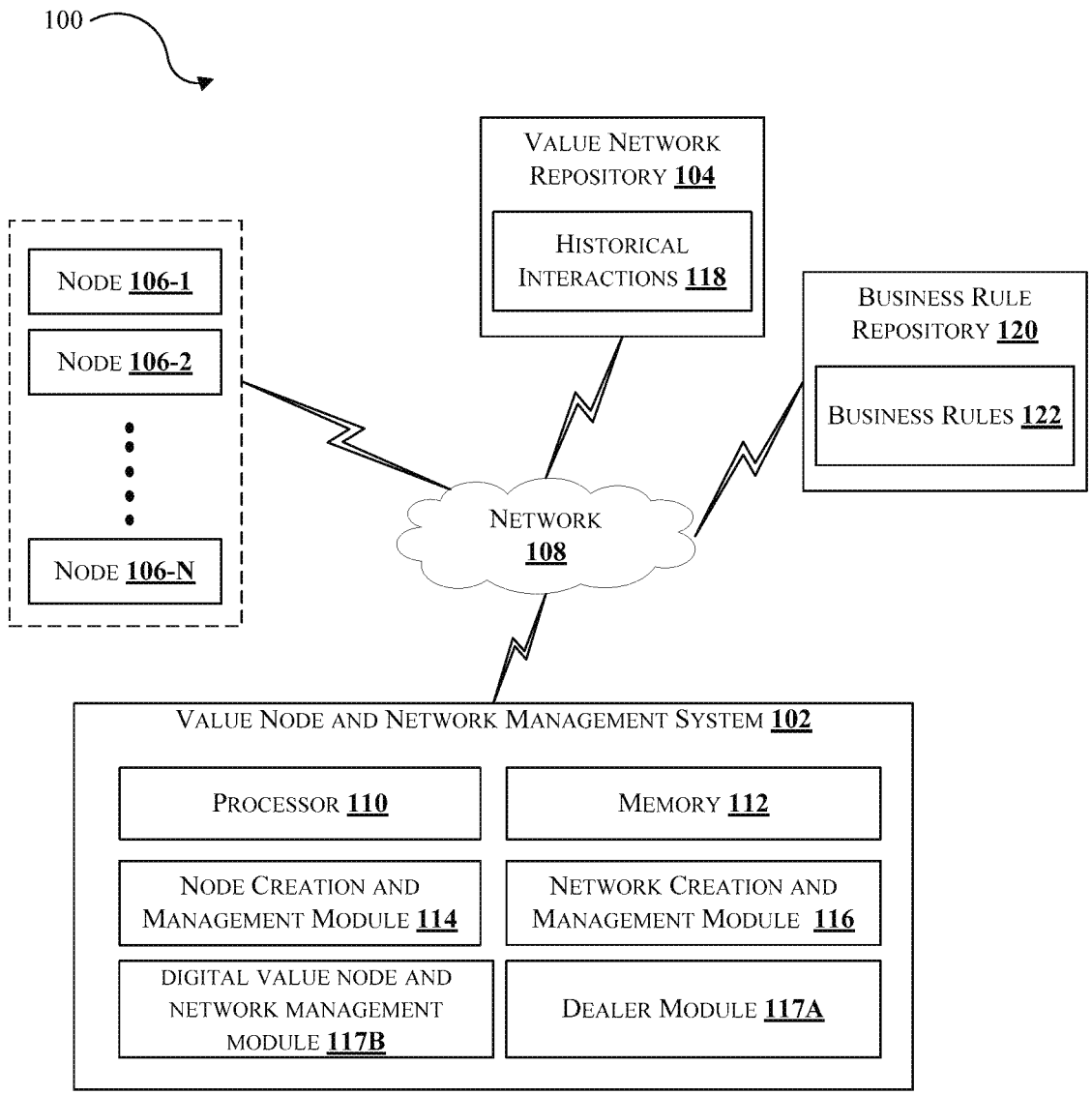
FIG. 1 illustrates an architecture diagram of an exemplary system for enabling real time logistics management to customer in accordance with some embodiments of the present disclosure.
Figure 2:
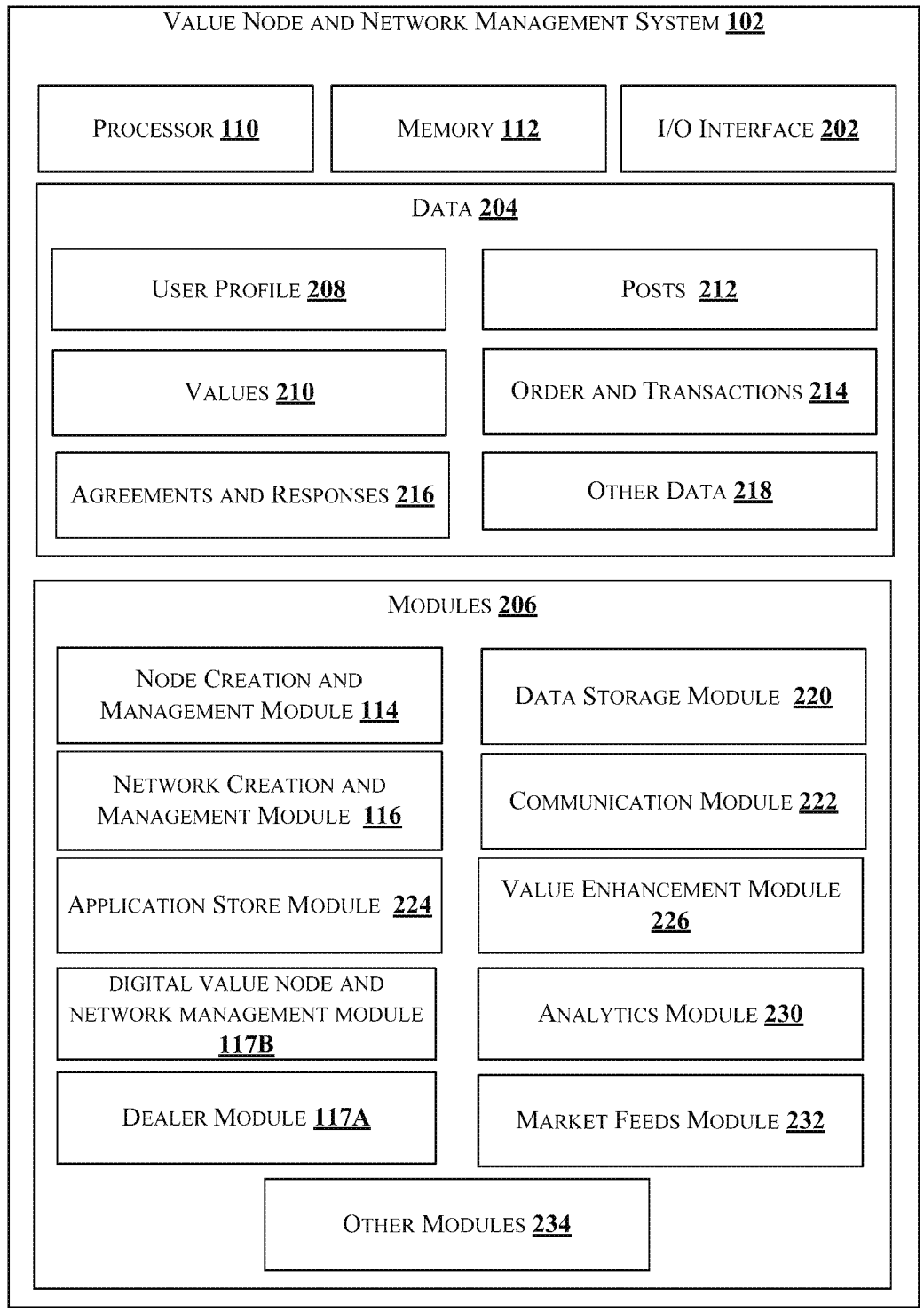
FIG. 2 illustrates an exemplary block diagram of a value node and network management system of FIG. 1 in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE PREFERRED EMBODIMENT

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure provide a system and method of enabling creation and management of a real time digital value network. Nodes are created, each node representing a user and a digital value network is then created based on the nodes thus created. The digital value network comprises a nodes and plurality of connections and real time interactions, each connection connecting one or more nodes based on a user profile of the user and a plurality of values associated with the one or more nodes. Thus, the VNNMS provides online support to customers or buyers and sellers in a real-time shared environment and enables value creation, optimization and value delivery. End-to-end approach delivers guaranteed realized savings to group of customers forming the network. The network of customers can be managed and expanded globally.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates architecture diagram of a system 100 for enabling real time logistics management in accordance with some embodiments of the present disclosure.

In one embodiment, the system 100 comprises a value node and network management system (hereinafter referred to as VNNMS) 102, a value network repository 104, and one or more nodes 106-1, 106-2, ... 106-N (collectively referred to as nodes 106) representing one or more users coupled via a network 108. The users may be for example, an individual, organization, and a group. The group may be one of a group of individuals, a group of organizations and combinations thereof. Each node 106 may comprise a user device that may be for example, a mobile device generally a portable computer or a computing device including the functionality for communicating over the network 108. For example, the user device can be a mobile phone, a tablet computer, a laptop computer, a handheld game console, or any other suitable portable devices. The network 108 may include, without limitation, a direct interconnection, local area network (LAN), wide area network (WAN), wireless network (e.g., using Wireless Application Protocol), the Internet, etc.

The VNNMS 102 comprises a node creation and management module (hereinafter referred to as node module) 114 and a network creation and management module (hereinafter referred to as network module) 116 coupled with the node module 114. The value network repository 104 stores historical transactions 118 of the nodes 106 recorded in the past. The VNNMS 102 further comprises a business rule repository 120 that stores a plurality of business rules 122 related with business requirements. In one embodiment, the VNNMS 102 includes a central processing unit ("CPU" or "processor") 110, a memory 112 and an I/O interface 202. The I/O 202 interface is coupled with the processor 110 and an I/O device (not shown). The I/O device is configured to receive inputs via the I/O interface 202 and transmit outputs for displaying in the I/O device via the I/O interface 202. The VNNMS 102 further comprises data 204 and modules 206. In one implementation, the data 204 and the modules 206 may be stored within the memory 112. In one example, the data 204 may include user profile 208, a plurality of values 210, posts 212, orders and transactions 214, agreements and responses 216 and other data 218. In one embodiment, the data 204 may be stored in the memory 112 in the form of various data structures. Additionally, the aforementioned data can be organized using data models, such as relational or hierarchical data models. The other data 218 may be also referred to as reference repository for storing recommended implementation approaches as reference data. The other data 218 may also include temporary data and temporary files, generated by the modules 206 for performing the various functions of the VNNMS 102.

Figure 3:
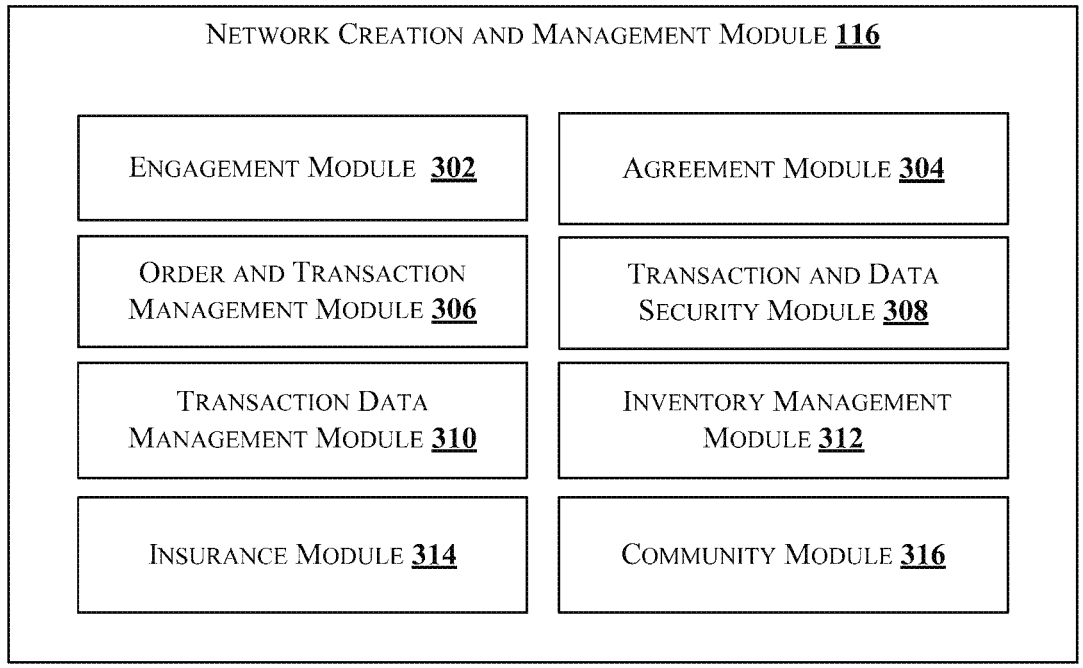
FIG. 3 illustrates an exemplary block diagram of a network creation and management module of FIG. 1 in accordance with some embodiments of the present disclosure.

The modules 206 may include, for example, the node module 114, the network module 116, a data storage module 220, a communication module 222, an application store module 224, a value enhancement module 226, the dealer module 117A, an analytics module 230, and a market feeds module 232. The network module 116, as illustrated in FIG. 3, comprises one or more modules including an engagement module 302, an agreement module 304, an order and transaction module 306, a transaction and data security module 308, a transaction data management module 310, an inventory management module 312, an insurance module 314 and a community module 316. The modules 206 may also comprise other modules 234 to perform various miscellaneous functionalities of the VNNMS 102. It will be appreciated that such aforementioned modules may be represented as a single module or a combination of different modules. The modules 206 may be implemented in the form of software, hardware and/or firmware.

In one embodiment, the node module 114 enables creation of one or more nodes 106, each node 106 representing a user, the user is selected as at least one of an individual, organization, and a group, wherein the group is selected from one of a group of individuals, and a group of organizations and combinations thereof. In one example, the node 106 comprises at least a user profile and a plurality of values associated with the user. The user is a registered user having a unique login credentials based on which the user may access the VNNMS 102. In one implementation, the node module 114 receives user data associated with the user profile 208 such as login name, and password input by the user and verifies the received user profile 208 with a previously stored user data located in the value network repository 104. The VNNMS 102, in one example, comprises the user profile 208; each of the user profile 208 comprises data of a user including name, address, login name, password, status information, recommendation, rating and other associated data. In another example, the value network repository 104 is configured to store the user profile 208 associated with all registered users of the VNNMS 102 and the plurality of values 210 associated with the nodes 106. In one example, the plurality of values 210 comprises information associated with a value sought or offered in one of the form of a service, product, project, job, article, event, recommendation, third-party software applications, insurance, finance, and rating. In case of a new user, the VNNMS 102 enables the user to register by creating a new user profile with a unique login name and password. Based on the login credentials, the users are allowed to access the VNNMS 102. Upon successful authentication, the user can perform one or more transactions based on the requirement. In one example, if the user is a customer or a buyer, who requires the services of a transporter or logistics service provider, may conduct a search for a logistics service provider or a broker and perform one or more transactions with the logistics service provider or the brokers thus determined by search. In another example, if the user is a seller i.e. a logistics service provider or a broker, the user may input the quote or the rate associated with one or more serviced routes available.

Upon creating the nodes, the network module 116 creates a real time digital value network by generating a plurality of real time interactions and connections, each connecting one or more nodes. The network module 116 determines the node to be connected with other nodes and interactions based on at least the user profile 208 and the corresponding plurality of values 210 of the one or more nodes. In another embodiment, the dealer module 117A enables external users of the VNNMS 102 to create, verify, edit and modify the user profile 208 and the plurality of values 210 of the users, and to enable actions like post, order, transact, and manage the plurality of real time interactions and connections for the user. In one embodiment, the dealer module 117A is configured to enable external users to create, verify, edit and modify the one or more nodes, enables the plurality of real time interactions and connections for the one or more nodes. The system further comprises a digital value node and network management module 117B configured to enable view, and manage the one or more nodes, the plurality of real time interactions and connections of the one or more nodes. The real time interactions may comprise for example, financial and non-financial transactions; and the connections may comprise for example, follow, connect and partnership types of connections. The market feeds module 232 is configured to provide information associated with the plurality of values to enable creation of the one or more nodes and the plurality of interactions between the one or more nodes.

In one embodiment, the node module 114 creates a plurality of posts 212, each post 212 comprises information associated with the plurality of values 210 that are sought and offered by each of the nodes 106. The node module 114 may also group one or more posts 212 that are determined to be similar based on the plurality of values 210 associated with the one or more posts 212 prior to creating the plurality of posts. Upon creating the plurality of posts 212, the node module 114 dynamically groups the one or more posts based on the plurality of values 210 currently associated with the one or more posts. The node module 114 further creates the plurality of connections between two nodes 106 including a user and a group or organization to enable the user to be part of the group or organization. The node module 114 also assigns at least one or more rights to the nodes 106, wherein the at least one right include information associated with right to post, to edit, to order and transaction, limit on the number of posts, orders and transactions and other related rights. FIGS. 85-88 illustrates exemplary screenshots displaying roles and report pages of users.

The network module 116 is configured to search, categorize, sort, filter and view the nodes 106 based on the user profile 208 and the plurality of values 210 associated with the nodes 106. The network module 116 also dynamically determines one or more other nodes 106 for connecting with at least one node based on the plurality of values 210 and historical interactions 118 associated with the at least one node. The historical interactions 118 may comprise financial and non-financial transactions made in the past by the at least one node and stored in the value network repository 104. The network module 116 further views and analyses the plurality of connections and one or more nodes 106 connected via the plurality of connections and modify existing connections. In one implementation, the network module 116 deletes existing plurality of connections between each or multiple nodes 106 based on the user profile 208 and the plurality of values 210 associated with the one or more nodes 106.

Figure 4:
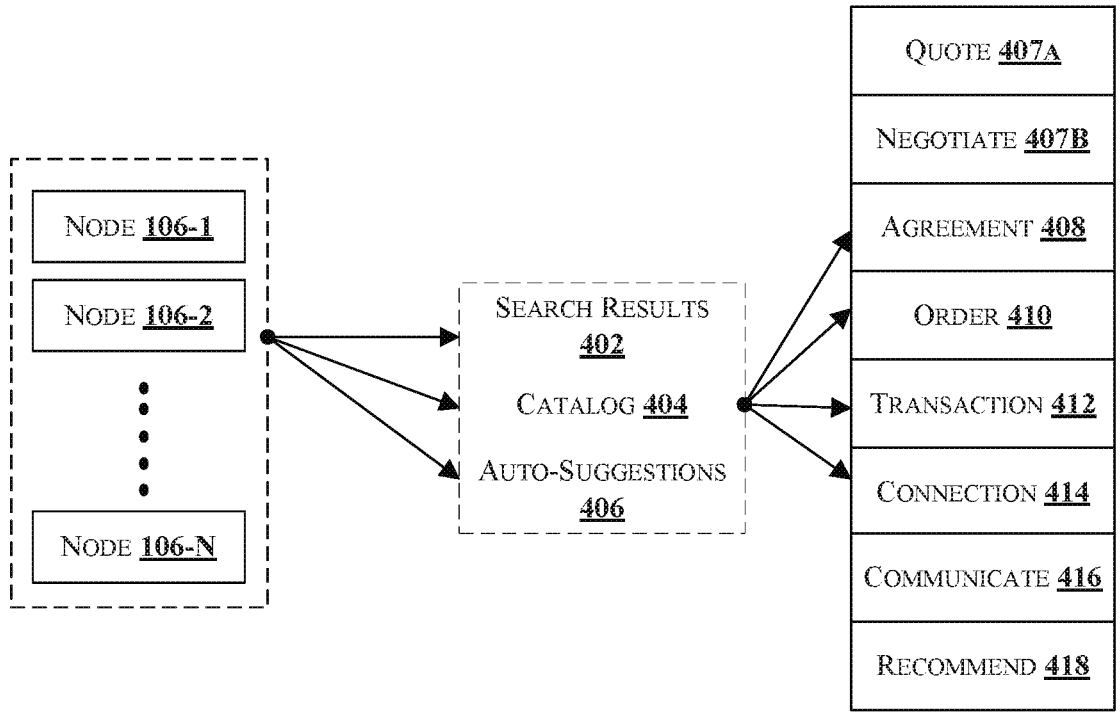
FIG. 4 illustrates an exemplary conceptual diagram of nodes and interactions of nodes in accordance with one embodiment of the present disclosure.

The engagement module 302 of the network module 116 analyses the nodes 106 and enables interactions and connections between the nodes 106. As illustrated in FIG. 4, the network module 116 analyses the nodes 106 based on one of search results 402, catalog 404 and auto-suggestions 406 in relation to the nodes 106 and enables interactions like quote 407A, negotiate 407B, agreements 408, order 410, transaction 412, connection 414, communicate 416 and recommend 418 among the one or more nodes 106.

Figure 5:
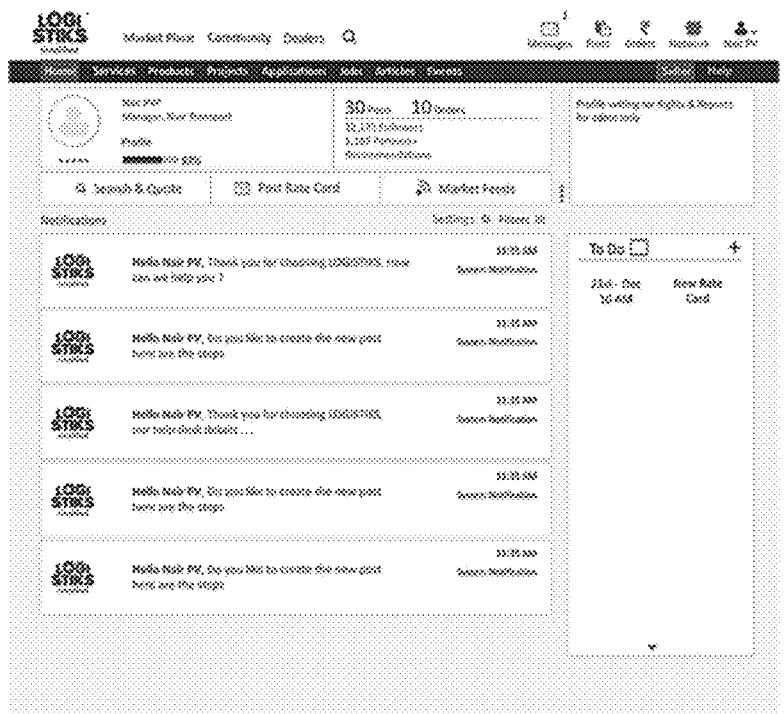
FIG. 5 illustrates an exemplary screenshot of home page of a seller of value in accordance with one embodiment of the present disclosure.
Figure 6:
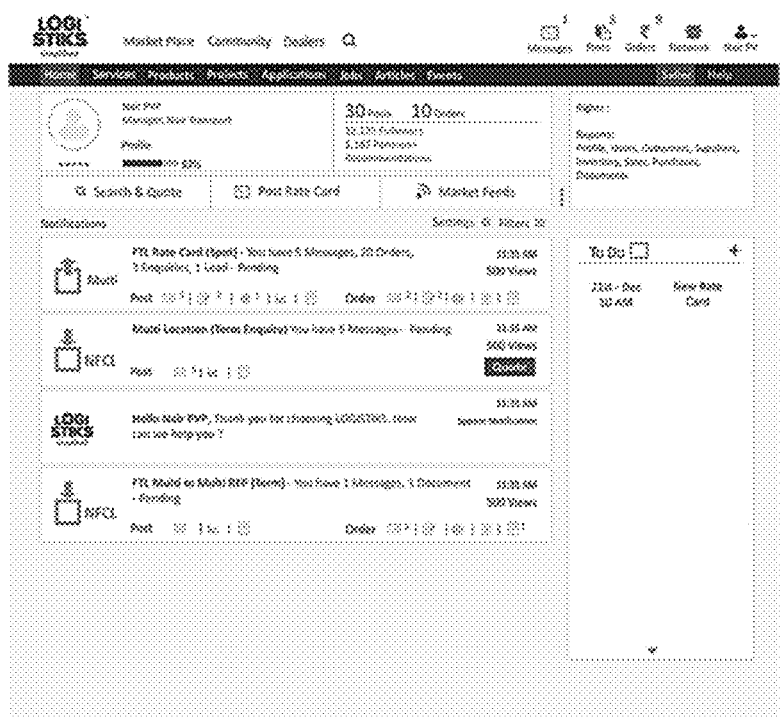
FIG. 6 illustrates an exemplary screenshot of notification page after seller's posting in accordance with one embodiment of the present disclosure.
Figure 25:
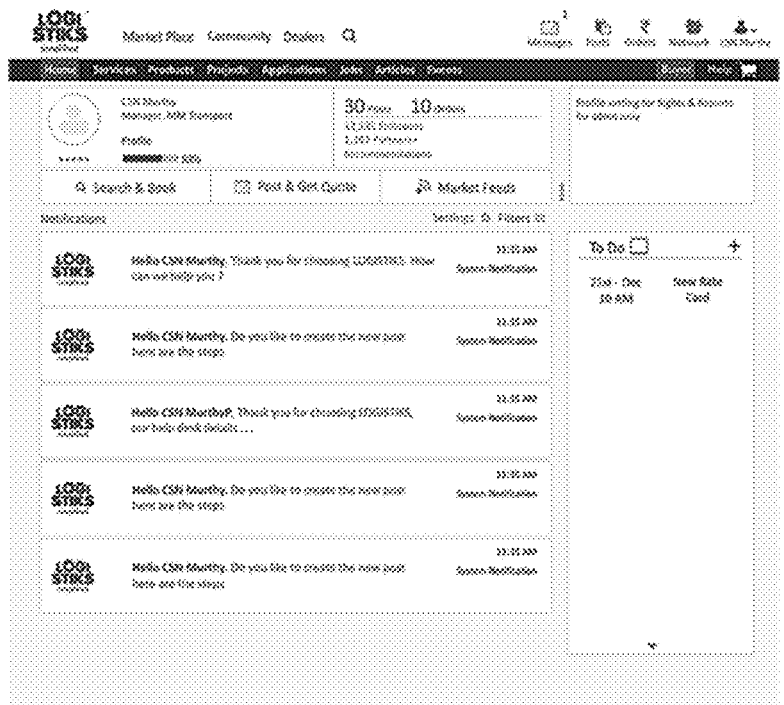
FIG. 25 illustrates an exemplary screenshot of home page of a buyer of value in accordance with one embodiment of the present disclosure.
Figure 26:
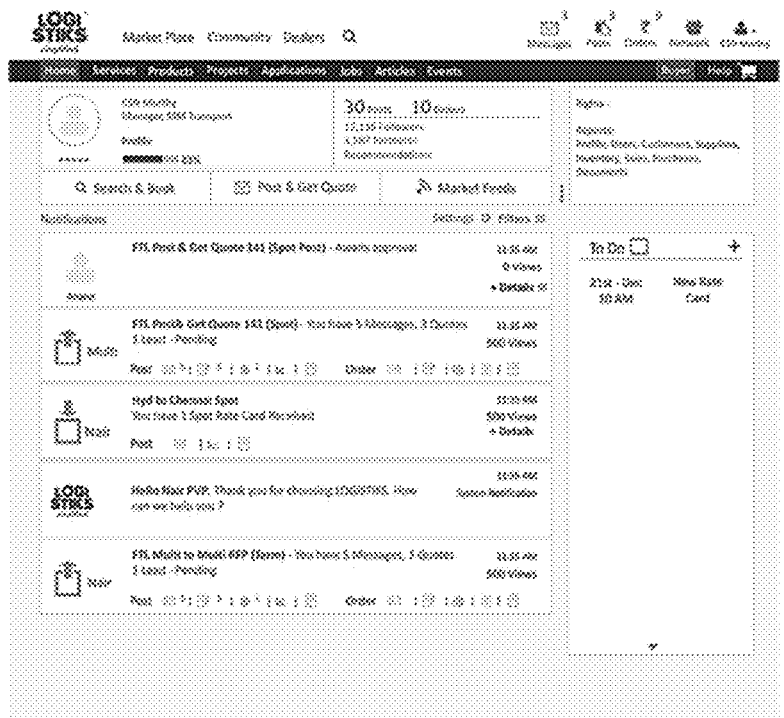
FIG. 26 illustrates an exemplary screenshot of notification page after buyer's posting in accordance with one embodiment of the present disclosure.

Let us consider a business case of a real time logistics management for enabling logistics related services to buyers by service providers. The VNNMS 102 creates a logistics value network by creating nodes and plurality of connections. The nodes 106 in the logistics value networks are customer, logistics service providers, brokers, and so on. The node module 114 creates the one or more nodes 106 and the network module 116 creates a plurality of connections between the one or more nodes 106. A logistics service provider or seller is provided with a user profile and login information to the VNNMS 102. Using the login information, the seller enters the home page as illustrated in FIG. 5 and the buyer enters the home page as illustrated in FIG. 25. If the seller or buyer had previously made posts related to the services offered or sought, the notification page is displayed as illustrated in FIGS. 6 and 26 respectively for the seller and buyer. In one example, the notification pages after posting the requirements, shall comprise all information associated with posting like number of post, number of orders accomplished, pending posts and so on.

Figure 7:
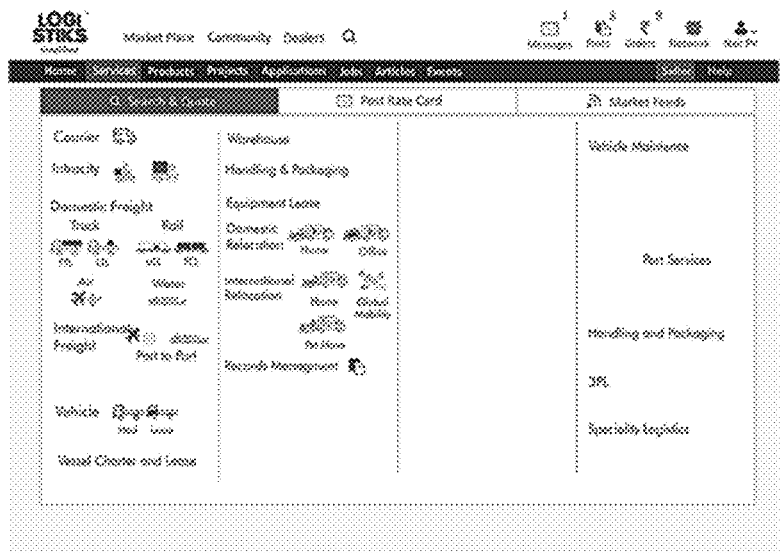
FIG. 7 illustrates an exemplary screenshot displaying list of services provided by the seller in accordance with one embodiment of the present disclosure.
Figure 8:
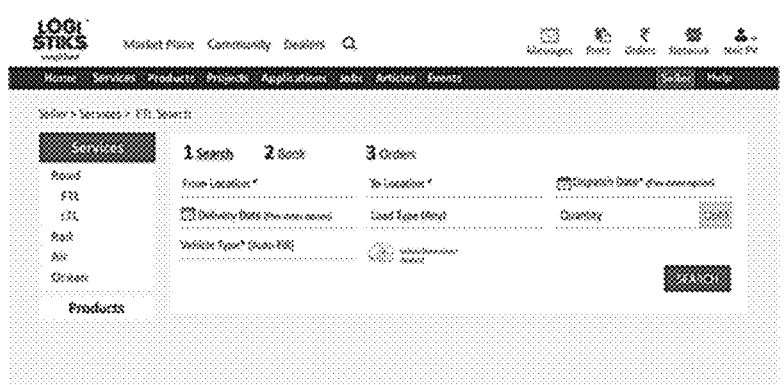
FIG. 8 illustrates an exemplary screenshot displaying search page at seller's end in accordance with one embodiment of the present disclosure.
Figure 27:
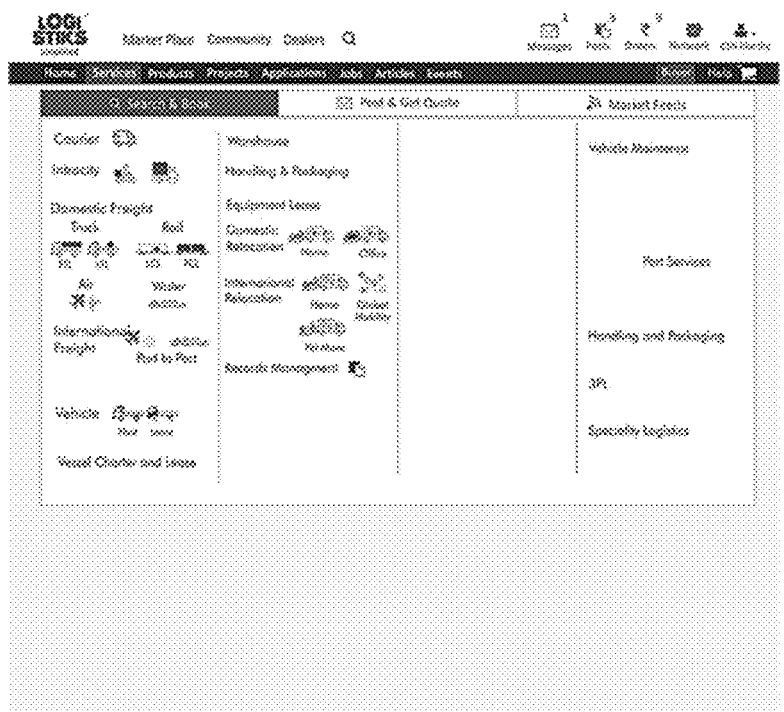
FIG. 27 illustrates an exemplary screenshot displaying list of services sought by the buyer in accordance with one embodiment of the present disclosure.
Figure 28:
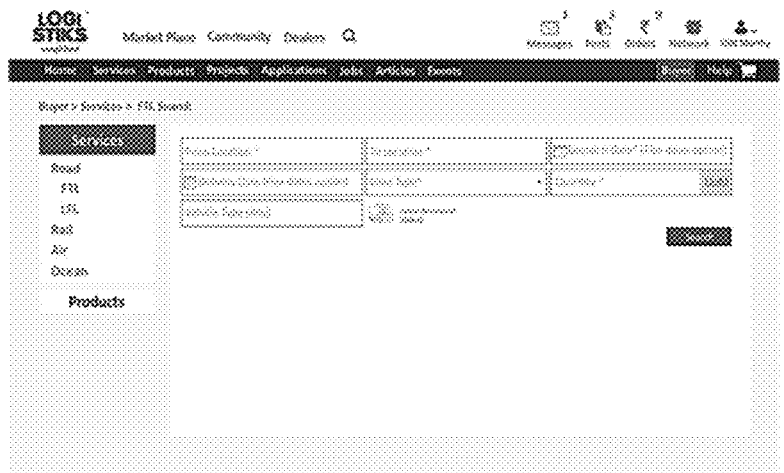
FIG. 28 illustrates an exemplary screenshot displaying search page at buyer's end in accordance with one embodiment of the present disclosure.

The network module 116 enables search to identify the services sought or offered by the buyer or seller. As illustrated in FIGS. 7 and 27, the network module 116 enables the nodes 106 to choose one of the services offered/sought by the seller/buyer. For example, services include courier services, intra city, domestic freight using truck and rail, air and water, international freight using air and water, vehicle transport and vessel charter and lease. Further, the services include warehouse rental or leased, handling and packaging, equipment lease, domestic relocation, international relocation and records management. The seller may search for his/her customers and the customers may search for the service providers to filter a list of logistics service providers or brokers using search parameters like source location, destination location, vehicle type, load type volume of consignment (quantity, units), date of dispatch, date of delivery (may be optional) and so on as illustrated in FIG. 8 for sellers and FIG. 28 for buyers. The vehicle type may be for example, full truck load (FTL), partial truck load (PTL), intra city, truck lease and so on. The user may also select one or more filters, available to narrow down the search, like starting rate & ending rate (rate band), payment mode, rating of the service providers or brokers (i.e. vendor) and tracking capability (for example, mile stone, real time) and so on.

Figure 9:
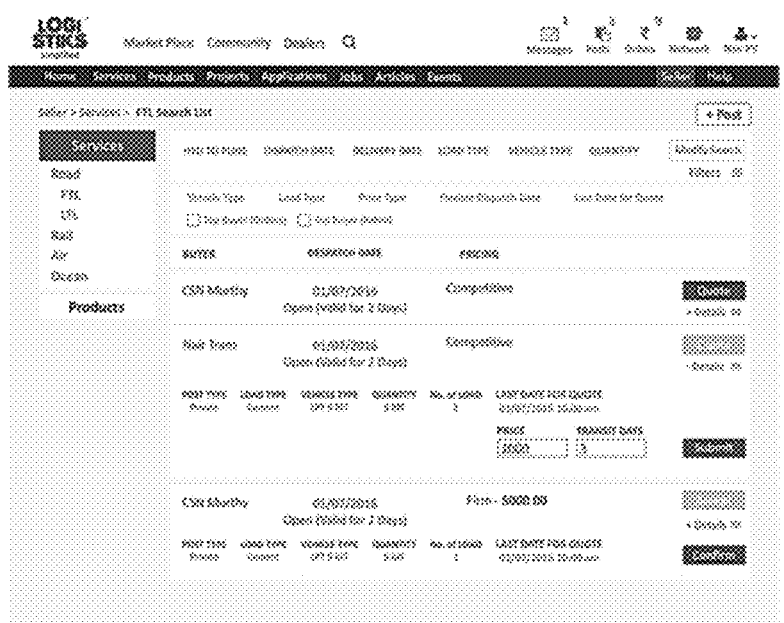
FIG. 9 illustrates an exemplary screenshot of search results of the seller's search in accordance with one embodiment of the present disclosure.
Figure 10:
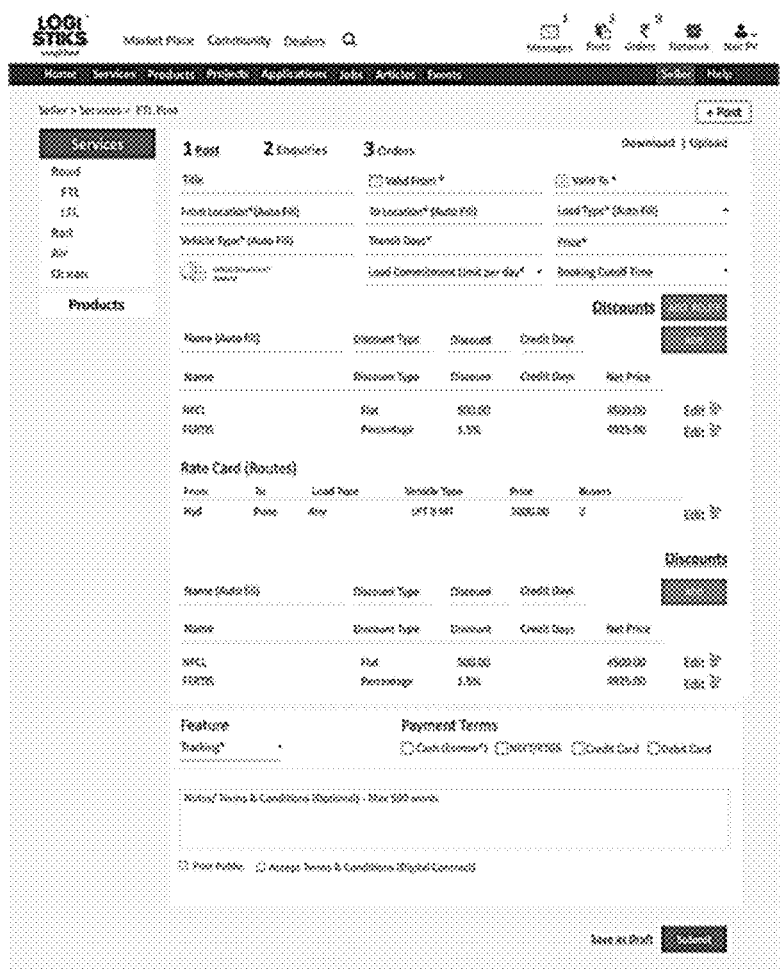
FIG. 10 illustrates an exemplary screenshot of seller's rate card in accordance with one embodiment of the present disclosure.
Figure 11:
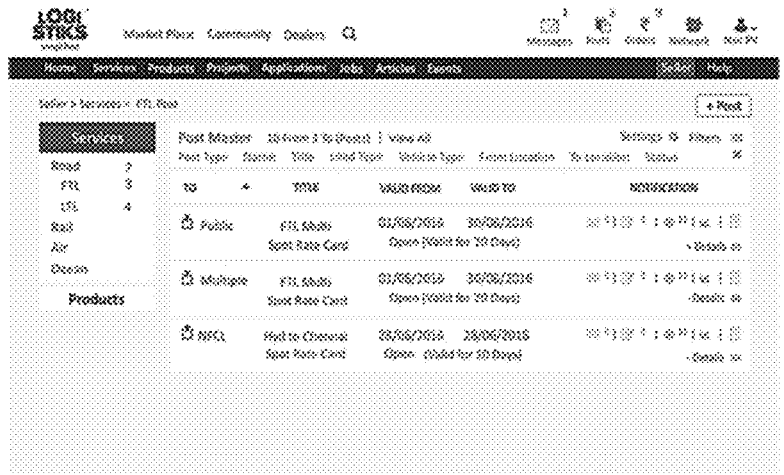
FIGS. 11 and 12 illustrate an exemplary screenshots showing seller's postmaster in accordance with one embodiment of the present disclosure.
Figure 12:
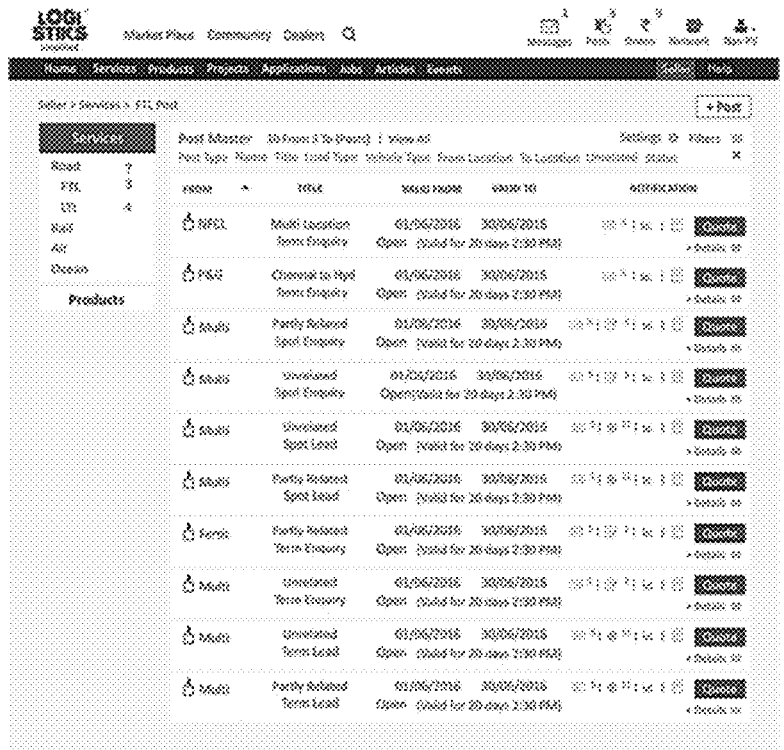
Figure 13:
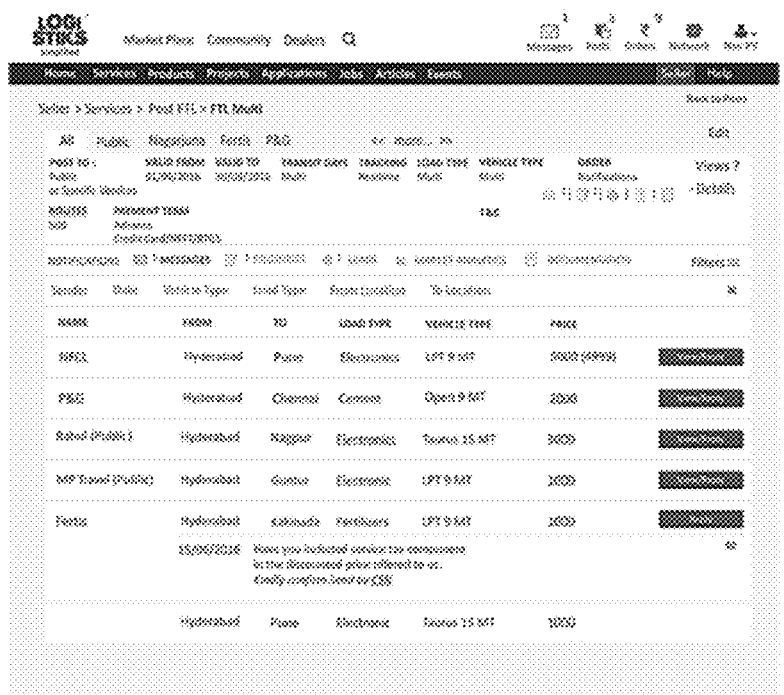
FIGS. 13, 14, 15 and 16 respectively illustrate an exemplary screenshot showing seller's messages, enquiries, leads, and documentation in accordance with one embodiment of the present disclosure.
Figure 14:
Figure 15:
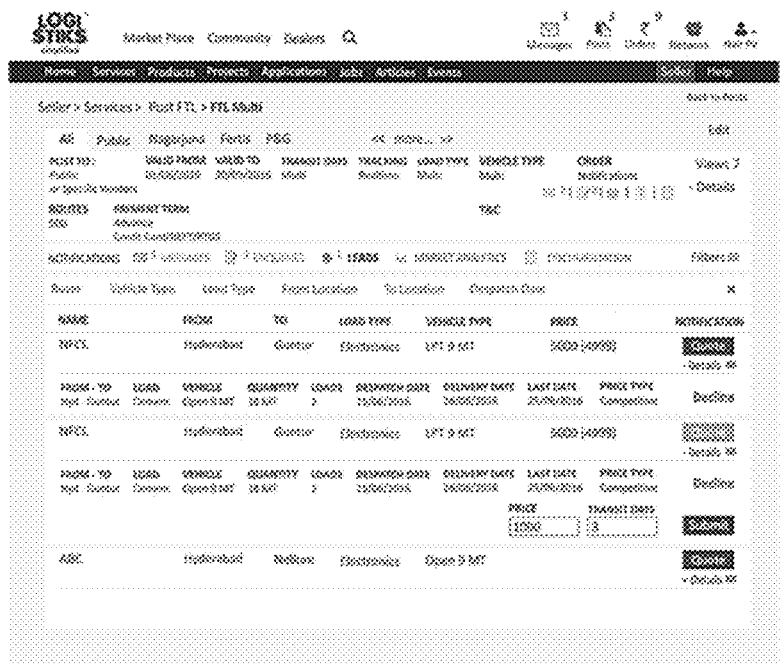
Figure 16:
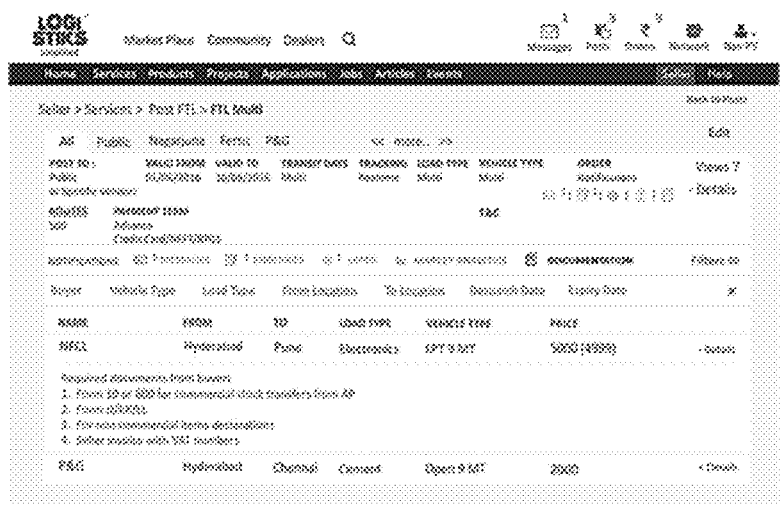
Figure 29:
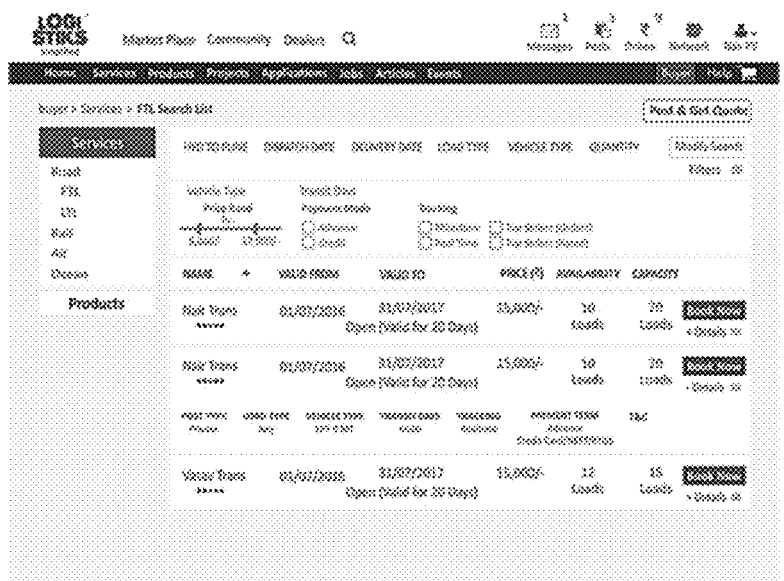
FIG. 29 illustrates an exemplary screenshot of search results of the buyer's search in accordance with one embodiment of the present disclosure.

As illustrated in FIG. 4, based on the input and filter information provided by the user, the engagement module 302 processes the received search information 210 and display one or more search results 402. Example search results 402 for a seller is illustrated in FIG. 9, displaying information including buyer name, despatch date, pricing, delivery date, load type, post type, vehicle type, quantity, last date for quote and so on. FIG. 10 illustrate a sample rate card of a seller that may be customized based on buyer's requirements. FIGS. 11 and 12 illustrates the list of posts from the master database made by the seller till the current time. Further, the search results 402 also display information or hyperlinks to access messages, quotes, leads, documents, market analytics and views as illustrated in FIGS. 13-16. Example search results 402 for a buyer is illustrated in FIG. 29, displaying information like vendor name, validity of the post, availability, capacity, rate offered and vehicle type, transit time and so on.

The engagement module 302 is configured to categorize, search and view the one or more nodes 106, and to assist in filtering, and sorting of the nodes 106 based on the search results and further to enable interactions and connections between the two or more nodes based on the search results. In one example, the engagement module 302 may also search for the nodes 106 i.e., a buyer or seller, in the catalog 404 or node directory previously created and updated in the value network repository 104. In another example, the engagement module 302 receives auto-suggestions 406 from the nodes 106 based on historical interactions 118 stored in the value network repository 104.

Figure 30:
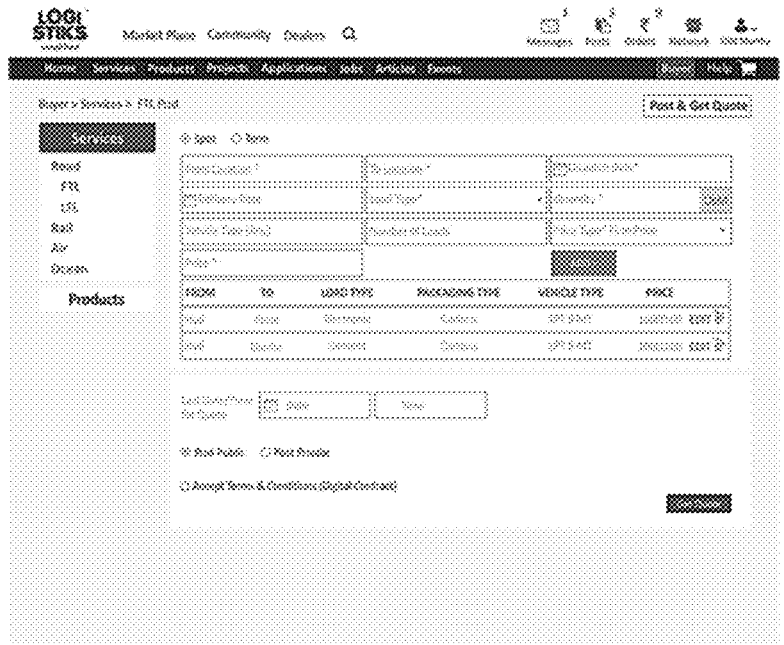
FIG. 30 illustrates an exemplary screenshot of buyer's post and get quote page for Spot contract in accordance with one embodiment of the present disclosure.
Figure 31:
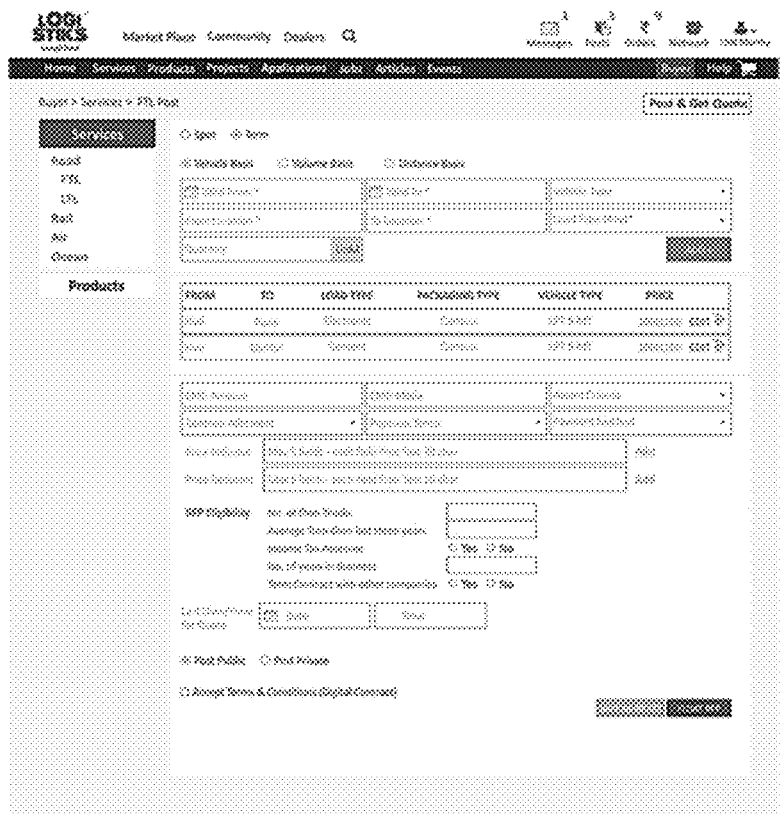
FIG. 31 illustrates an exemplary screenshot of buyer's post and get quote page for Term contract in accordance with one embodiment of the present disclosure.

In another embodiment, the buyer may generate one or more enquiries to place one or more contracts offered by sellers or service providers. In one example, the customer may enter into a spot contract or a term contract with the seller. FIG. 30 illustrates the page comprising a list of search parameters to be provided to enter a spot contract with a particular seller. FIG. 31 illustrates the page comprising a list of search parameters to be provided to enter a term contract with a particular seller. The search results include vehicle dispatch date, source location, destination location, vehicle type, load type, cost or pricing, and status (open or closed).

Figure 17:
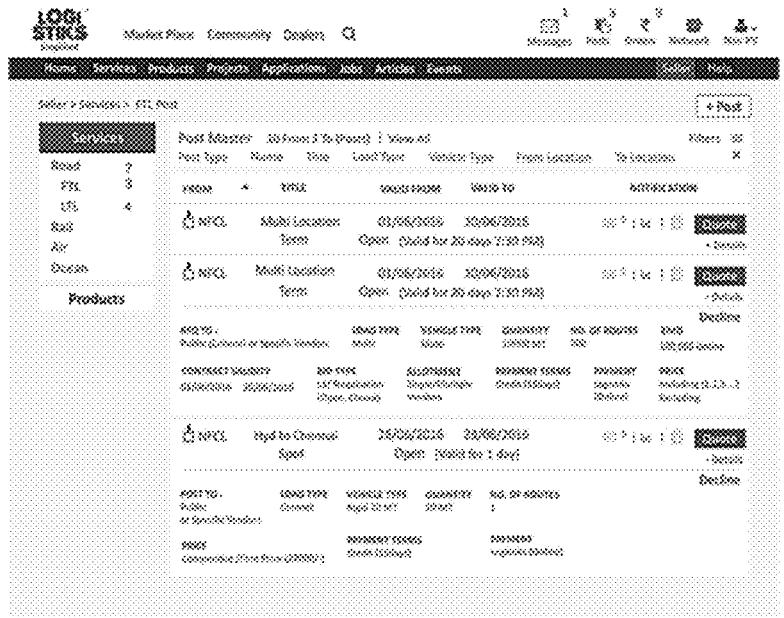
FIG. 17 illustrates an exemplary screenshot showing seller's post master upon posting a quote in accordance with one embodiment of the present disclosure.
Figure 18:
FIG. 18 illustrates an exemplary screenshot displaying seller's order master in accordance with one embodiment of the present disclosure.
Figure 19:
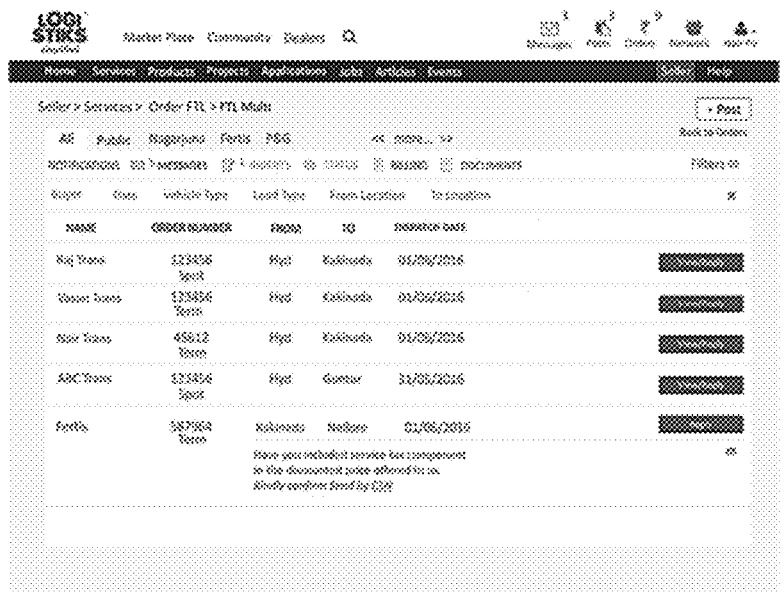
FIGS. 19, 20, 21, 22 and 23 respectively illustrate an exemplary screenshot displaying seller's order post messages, indents, order status, billing and documentation in accordance with one embodiment of the present disclosure.
Figure 20:
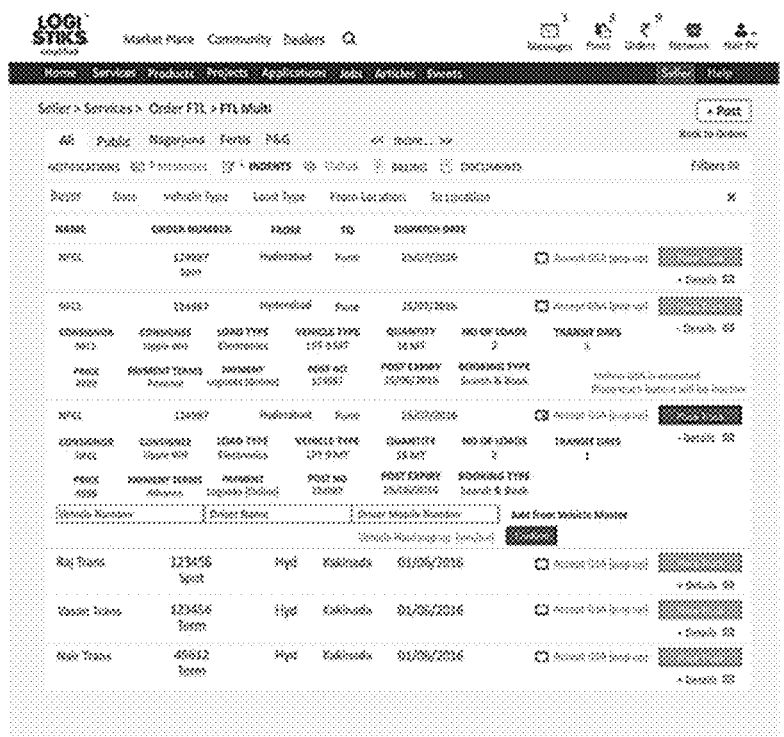
Figure 21:
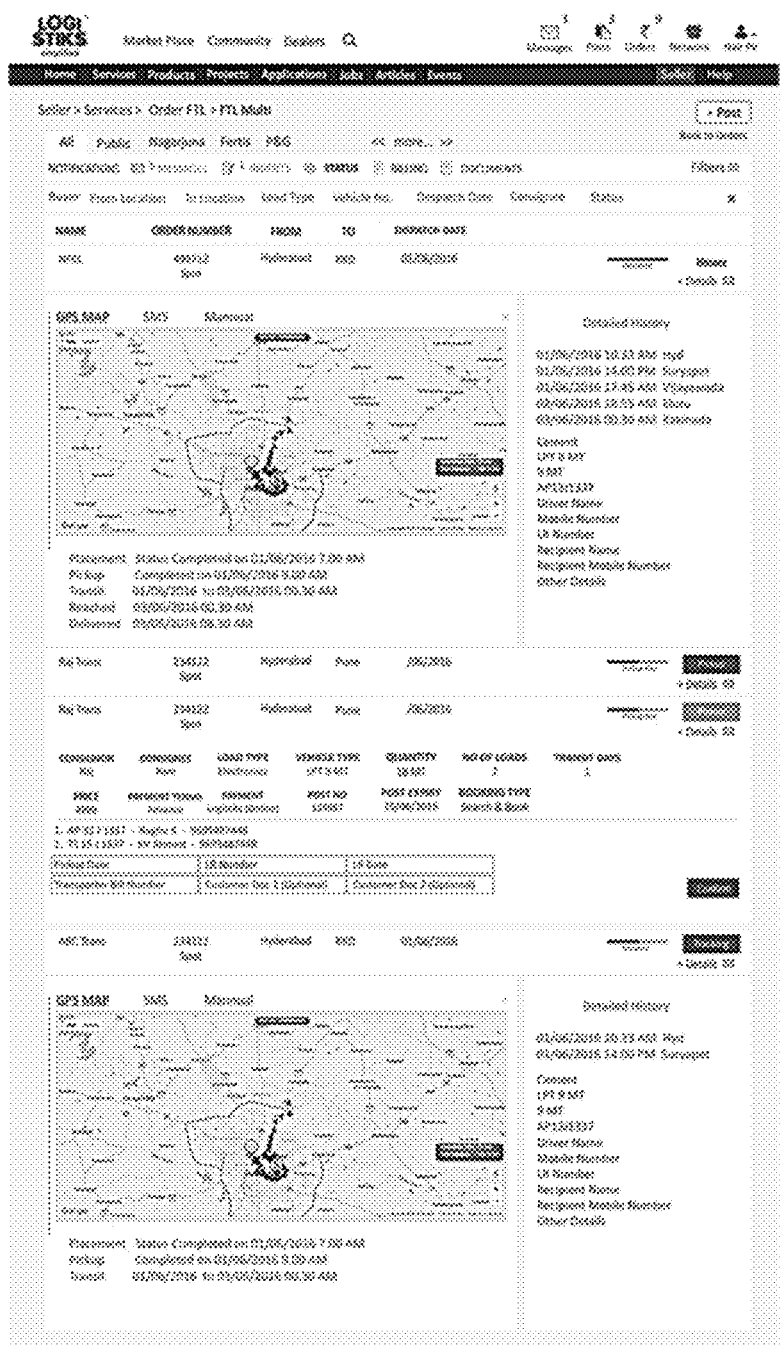
Figure 22:
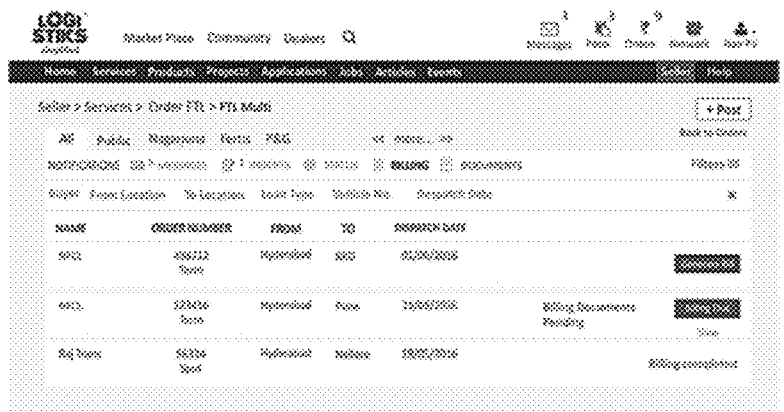
Figure 23:
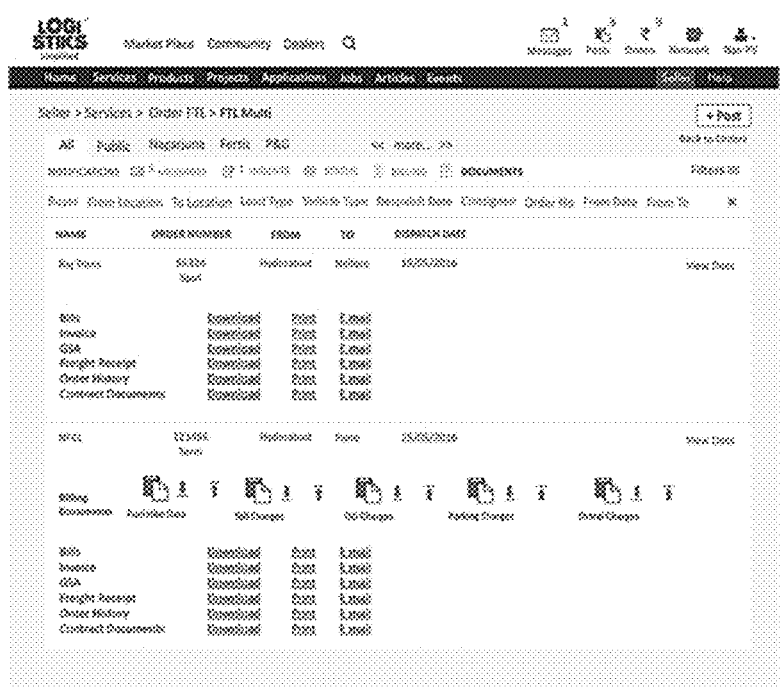
Figure 32:
FIGS. 32 and 33 illustrate an exemplary screenshot showing buyer's postmaster with outgoing posts in accordance with one embodiment of the present disclosure.
Figure 33:
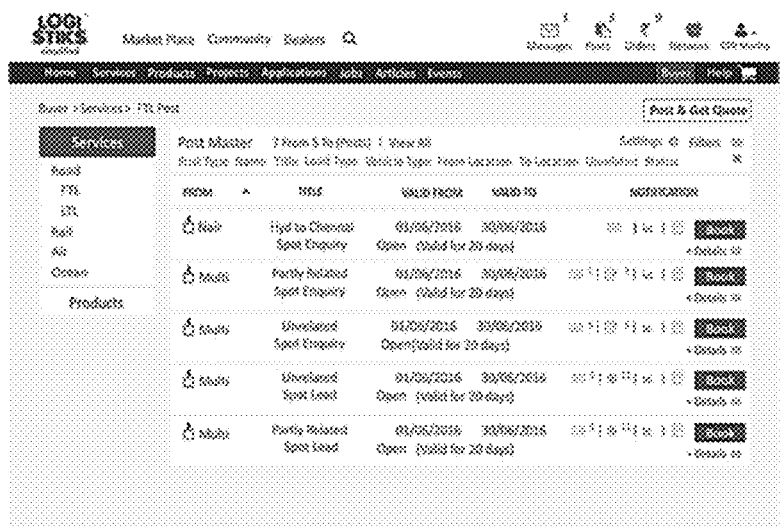
Figure 34:
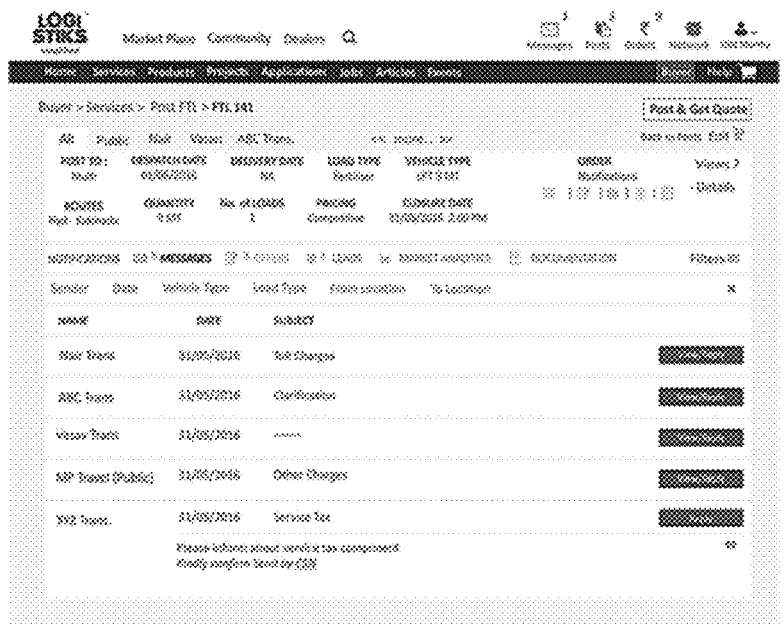
FIGS. 34, 35, 36, and 37 respectively illustrate an exemplary screenshot of buyer's post master's messages, offers, leads and documentation in accordance with one embodiment of the present disclosure.
Figure 35:
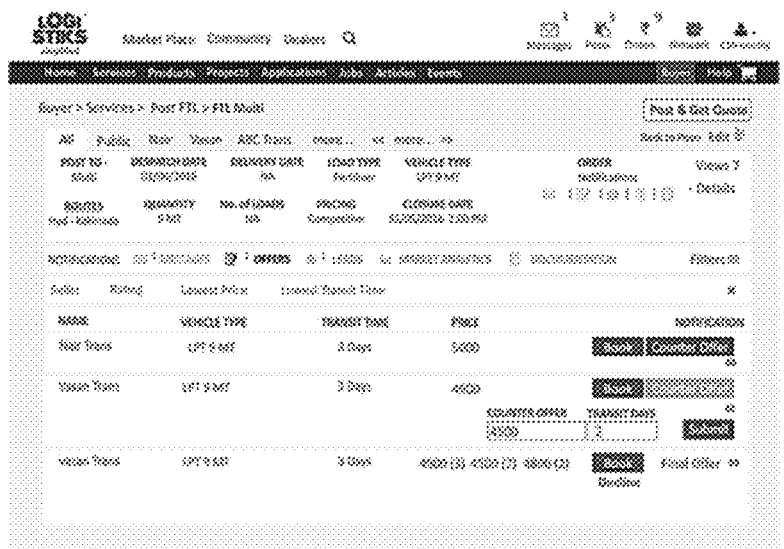
Figure 36:
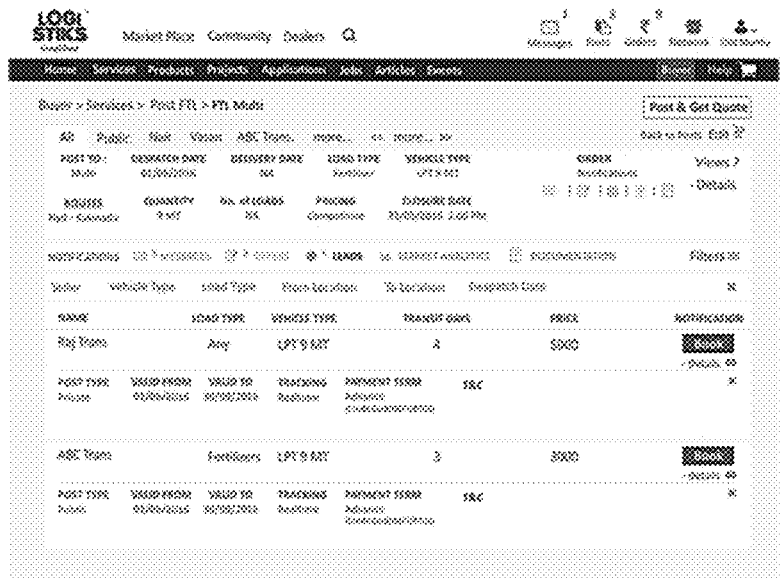
Figure 37:
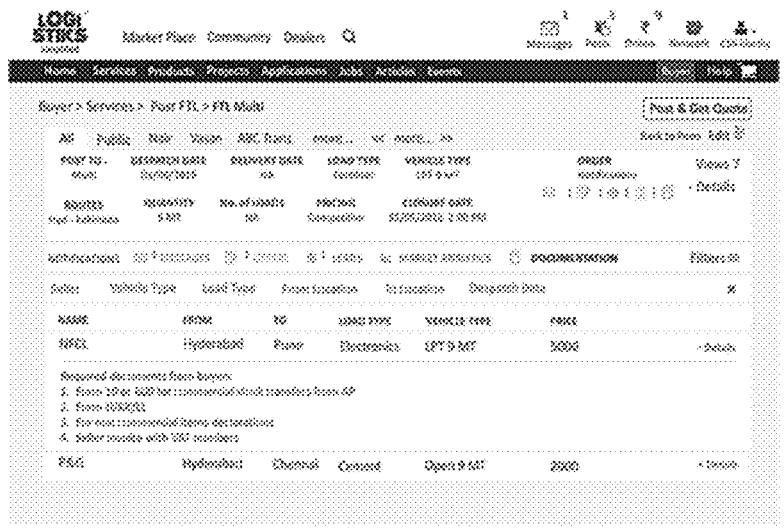
Figure 38:
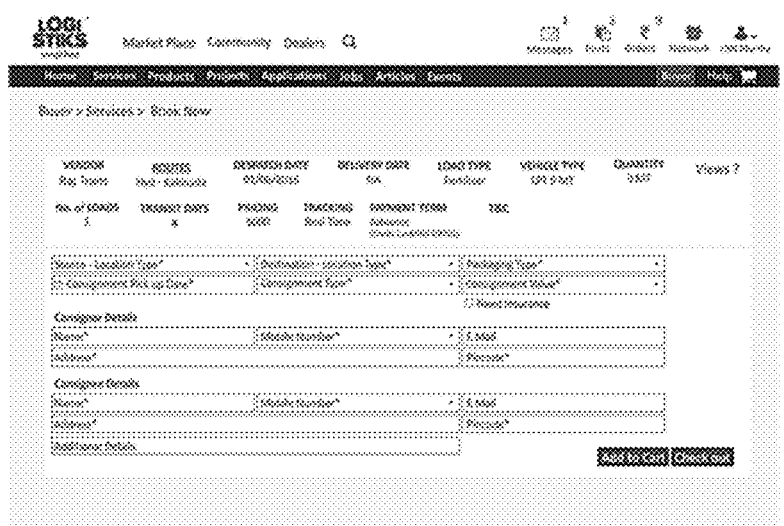
FIGS. 38 and 39 illustrate exemplary screenshots showing buyer's engagement pages in accordance with one embodiment of the present disclosure.
Figure 39:
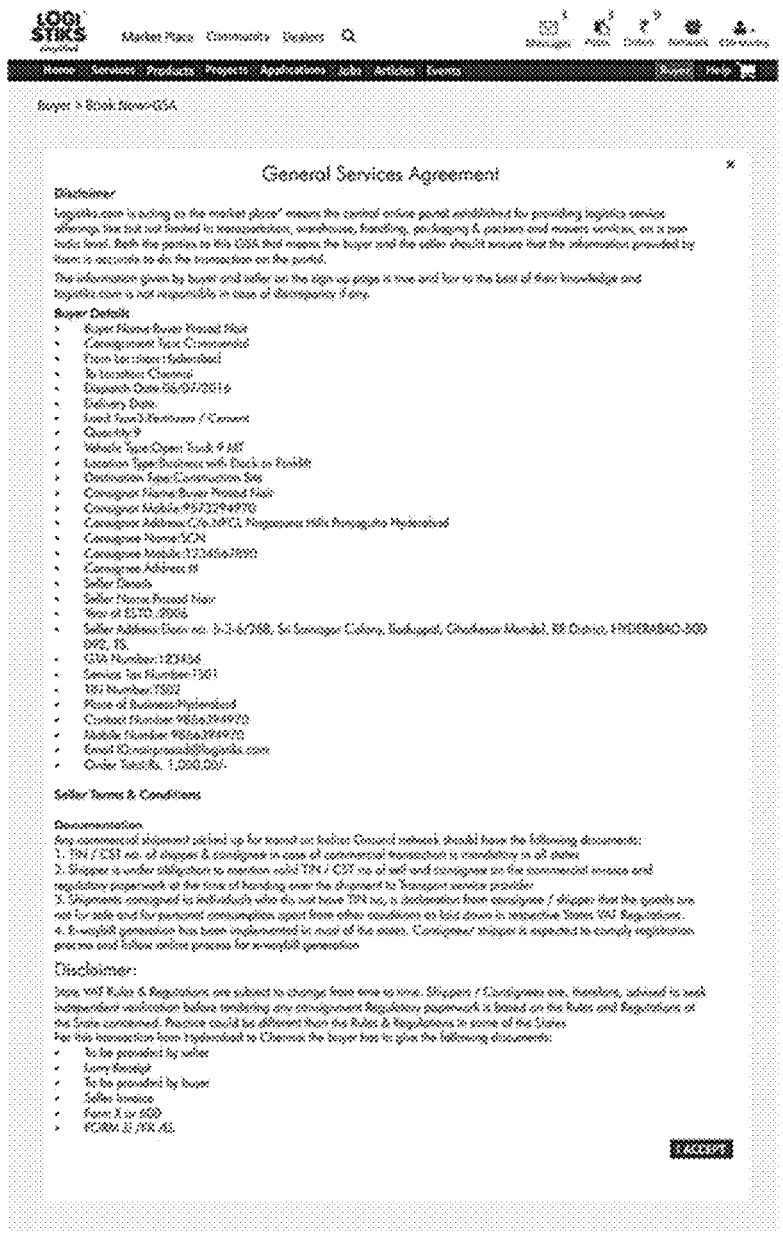

Further, the search results also display information or hyperlinks to access messages, quotes, leads, documents, market analytics and views as illustrated in FIGS. 32-33. The search results may also be generated based on input information as per the requirements of the customer. FIG. 17 illustrates the seller's post master upon posting a quote.

The engagement module 302 is configured to categorize, search and filter the nodes 106 based on the plurality of values 210, to receive the plurality of responses associated with the plurality of values 210 from the at least one node based on search results. The plurality of responses is made in response to enquiries that include enquiry type (spot or term), service type (post or get quote), source location, destination location, vehicle type, start contract date, end contract date and so on. The engagement module 302 processes the received input information and displays one or more generated enquiry results based on the processing. The enquiry results comprise the one or more logistics service providers and information like rating, vehicle type, transit days and pricing data associated with each of the one or more logistics service providers. Based on the requirement, the customer can choose to book a particular logistics service provider for availing the services offered by the booked logistics service provider.

In yet another embodiment, the customer can enquire for a quotation of logistics requirements by posting the enquiry as a post. The post may be made public or private. If the post is made public, then the enquiry is made available to all accessing the VNNMS 102, whereas if the post is made private, then the enquiry is made available only to members of the community. The engagement module 302 receives the input information from the customer for posting the enquiry, the input information includes enquiry type (spot/term contract), source location, destination location, dispatch date and delivery date (exact/flexible), load type, vehicle type, load weight, type of quote (competitive/firm), and type of post (public/private). The engagement module 302 processes the received input information and display a list of logistics service providers who can offer the service required by the customer meeting all the parameters mentioned as input information. The engagement module 302 also displays and manages the plurality of responses, quotes, messages, notifications, leads, market analytics, offers and documentation provided by at least one selected node. For example, the list of responses includes one or more of related, unrelated, and partly related responses associated with the value requirements of the selected node. Based on at least one of the plurality of responses and the plurality of values 210 sought or offered, the engagement module 302 selects and creates one or more agreements 408 with the one or more nodes 106. The agreement module 304 is configured to view one or more agreements 408, wherein each node is associated with a single or multiple agreements 408 and to categorize and group the one or more agreements 408 based on the plurality of values 210. The agreement module 304 is further configured to categorize, sort, and filter the one or more agreements 408, to enable sharing of the one or more agreements 408 with the one or more nodes 106 through messaging, email, and other communication tools and to receive and send notifications in relation to the one or more agreements 408. FIGS. 18-23 illustrate the seller's engagement to finalize the one or more agreements 408 offering the order. FIGS. 34-39 illustrate the buyer's engagement to finalize the one or more agreements 408 before making the order.

In still another embodiment, the customer may choose a particular logistics service provider based on auto-suggestions 406 or lead information provided by the VNNMS 102. For example, if a customer enters into a (full truck load) transportation contract with a service provider. The term contract is for a set of lanes for a specific period for a specified rate. Service provider to service the customer may require trucks from the market place. It will be difficult for the service provider to source trucks from the market on a daily basis manually. The engagement module 302 also generates auto-suggestions 406 or lead information for the service provider from the suppliers of truck in the market place. When a service provider enters into a contract with a customer for specified lanes for a specific period, the system identifies the requirement of specified truck types for the specified lanes/rates for that specific period and automatically generates auto-suggestions 406 or lead information for the service provider as and when a truck owner posts vehicle availability for the specified lane. This avoids ordering lead time for the service provider and getting the trucks at the right rates. Upon creating the one or more agreements 408, the buyer may place orders for the values 210 as per the terms and conditions agreed upon by the seller in the agreements 408.

Figure 24:
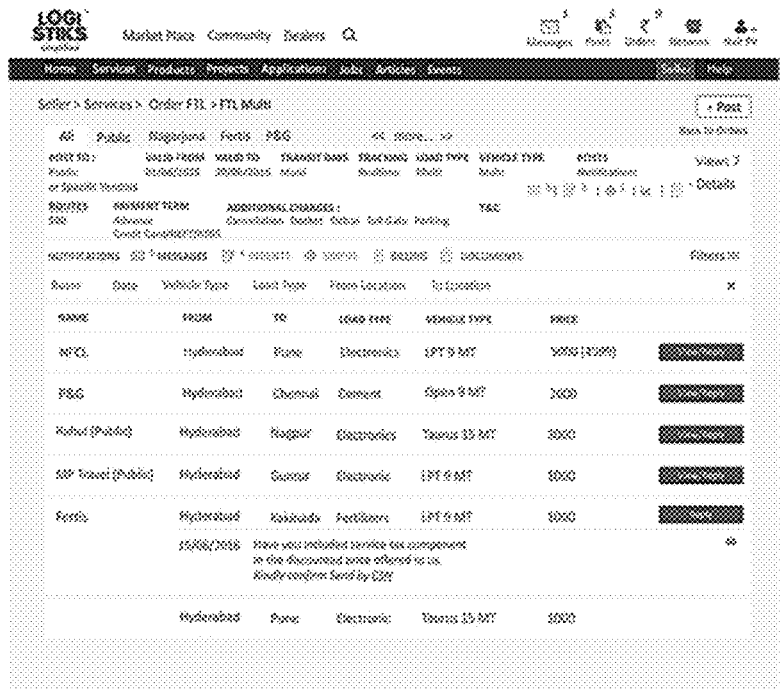
FIG. 24 illustrates an exemplary screenshot displaying list of order messages after posting in accordance with one embodiment of the present disclosure.
Figure 40:
FIGS. 40, 41, and 42 respectively illustrate an exemplary screenshot displaying buyer's cart, order payment page, and order confirmation in accordance with one embodiment of the present disclosure.
Figure 41:
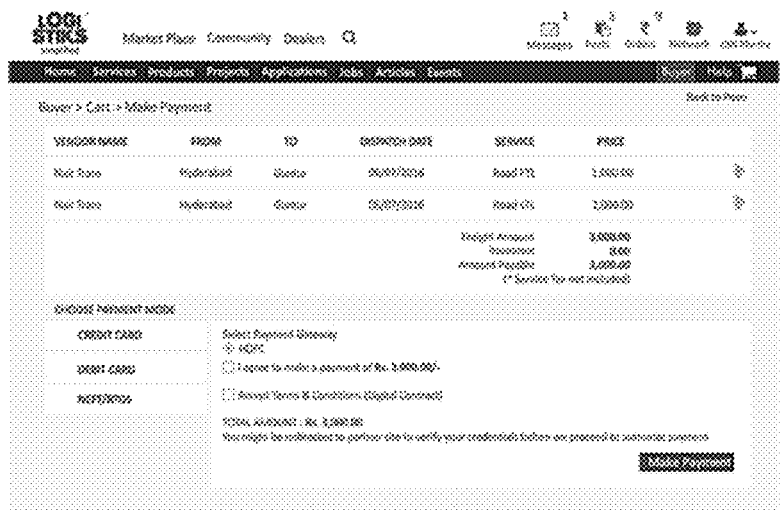
Figure 42:
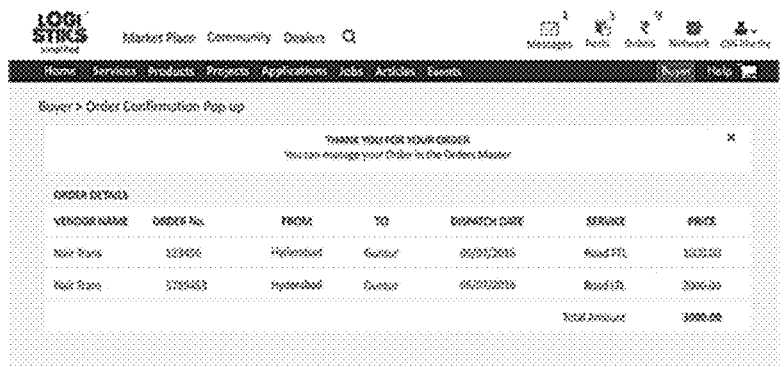
Figure 43:
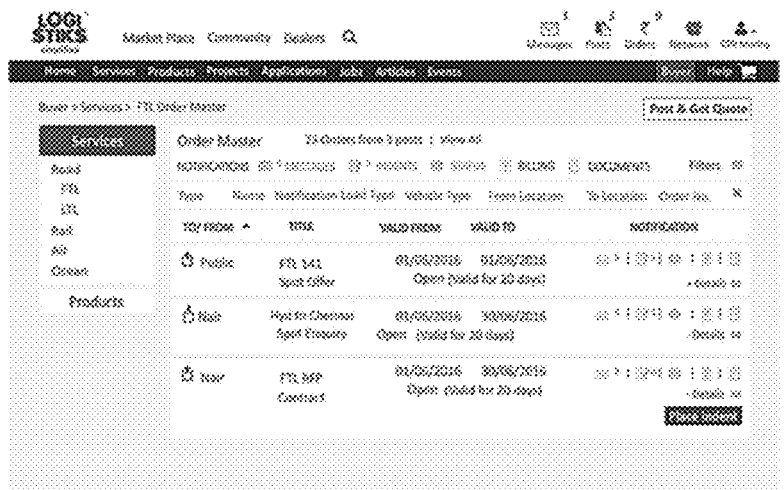
FIGS. 43 and 44 illustrate exemplary screenshot of buyer's order master page and order post messages respectively in accordance with one embodiment of the present disclosure.
Figure 44:
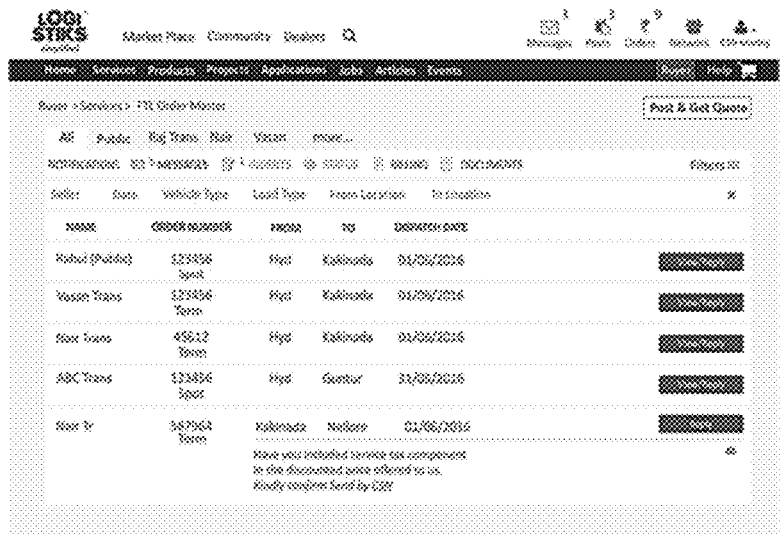
Figure 45:
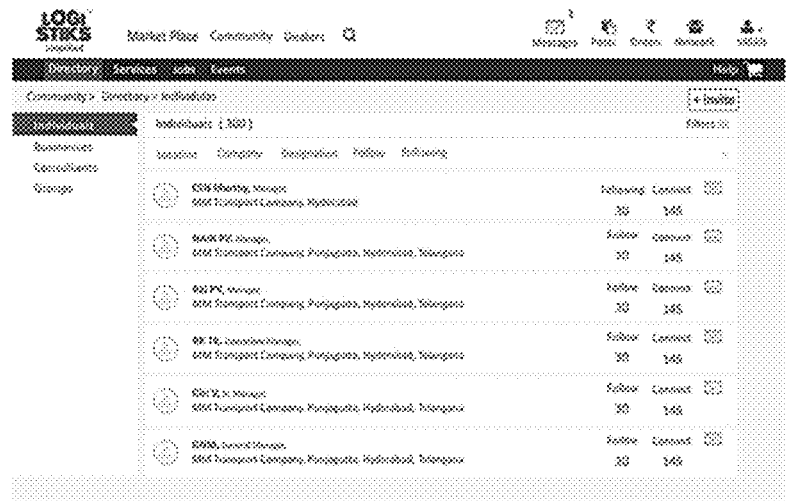
FIGS. 45-79 illustrates exemplary screenshots displaying community management pages in accordance with one embodiment of the present disclosure.
Figure 46:
Figure 47:
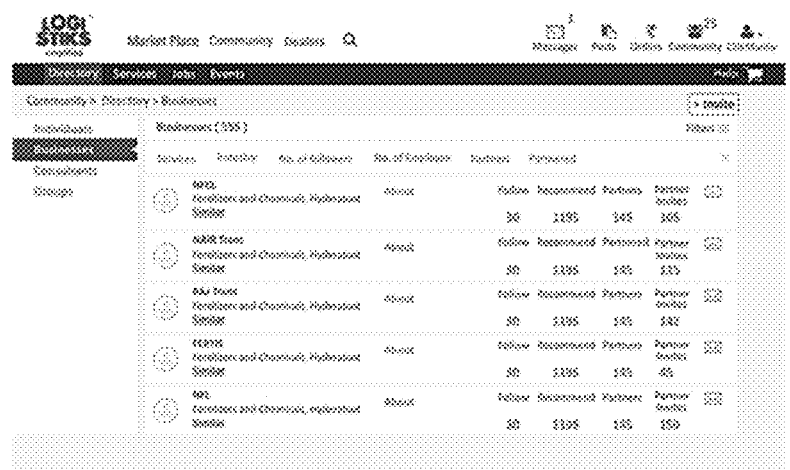
Figure 48:
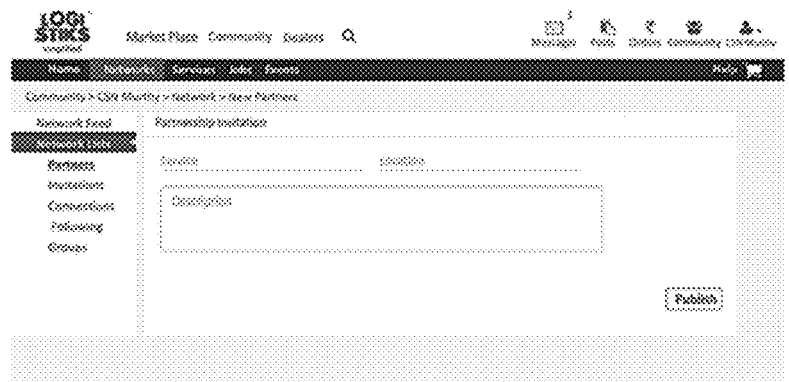
Figure 49:
Figure 50:
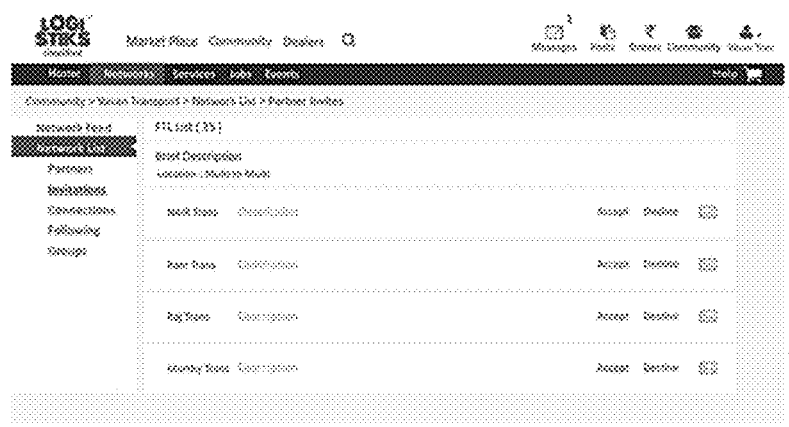
Figure 51:
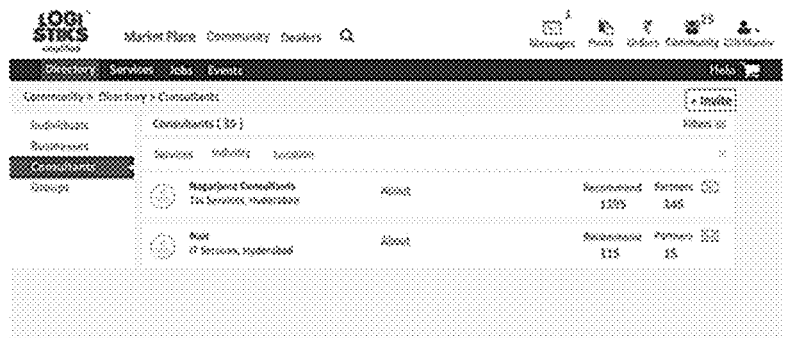
Figure 52:
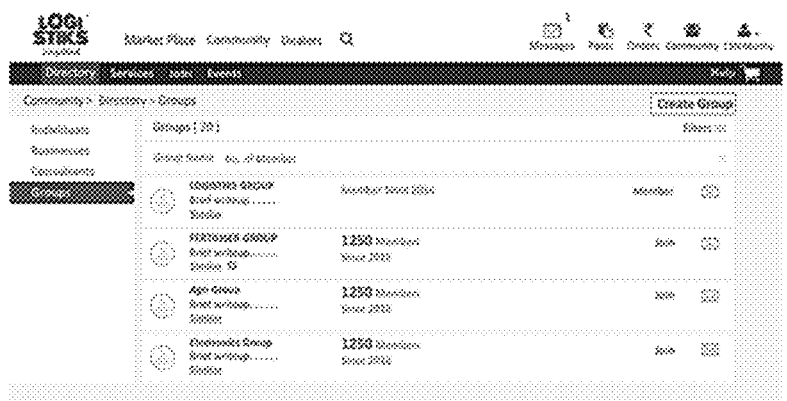
Figure 53:
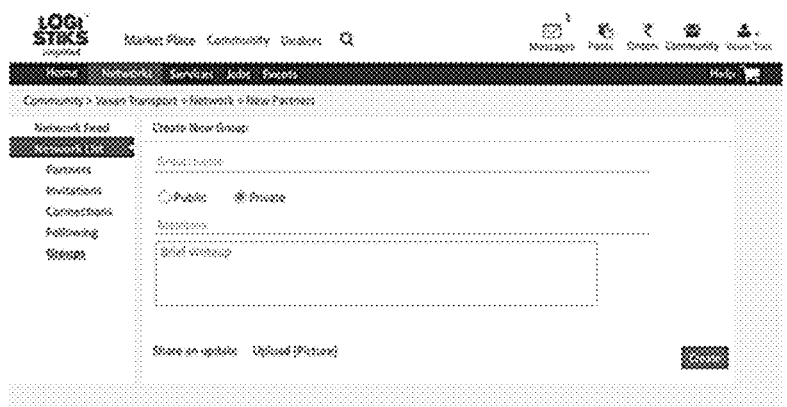
Figure 54:
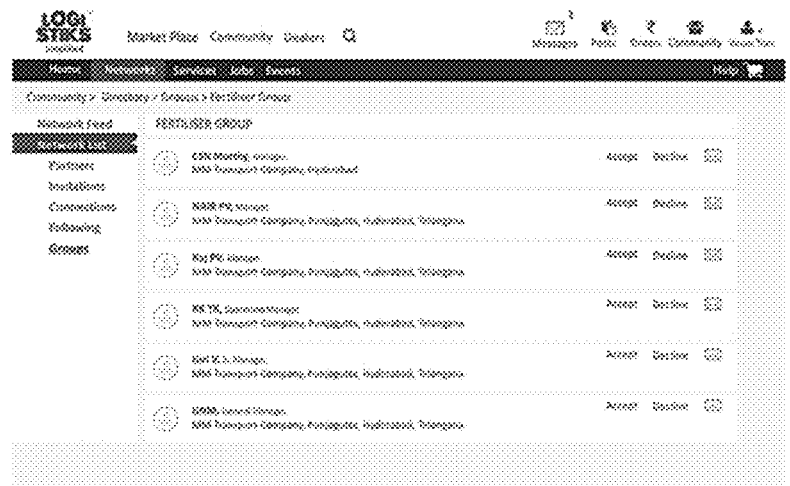
Figure 55:
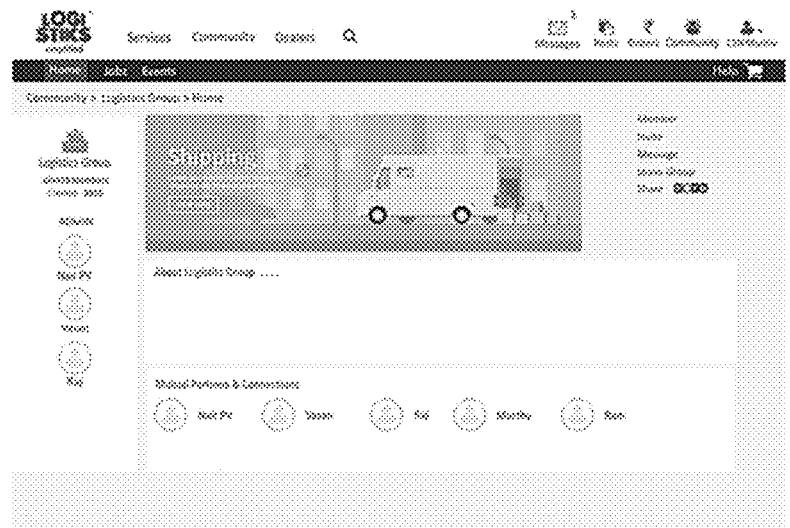
Figure 56:
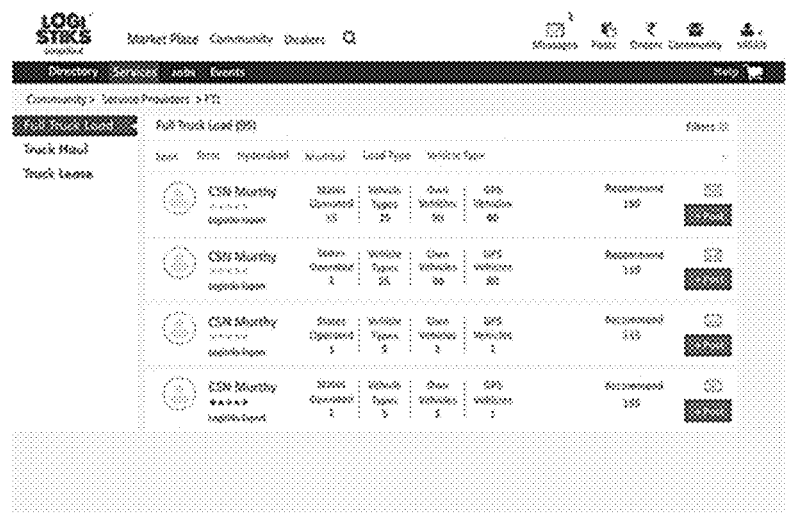
Figure 57:
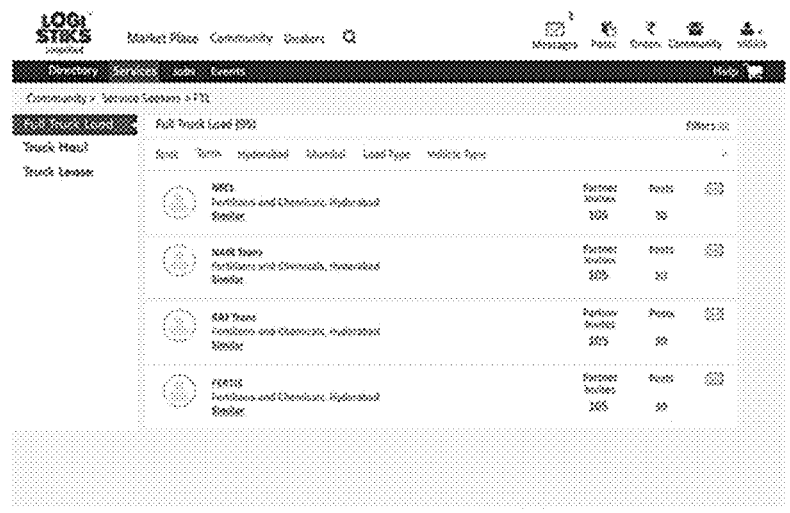
Figure 58:
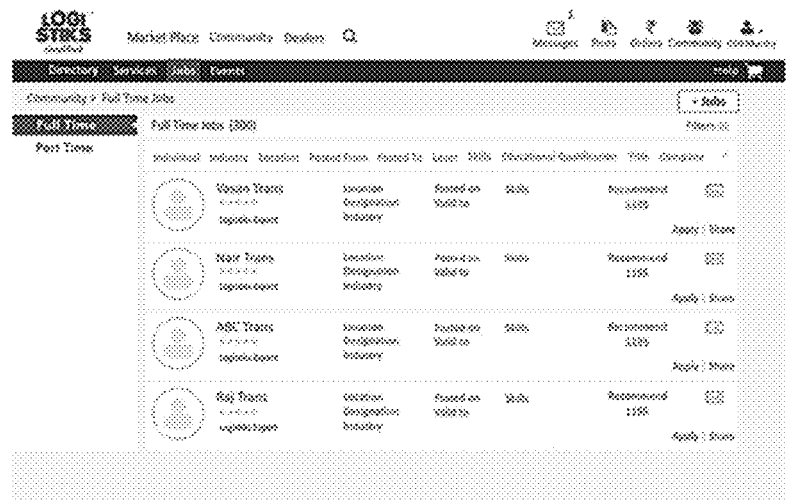
Figure 59:
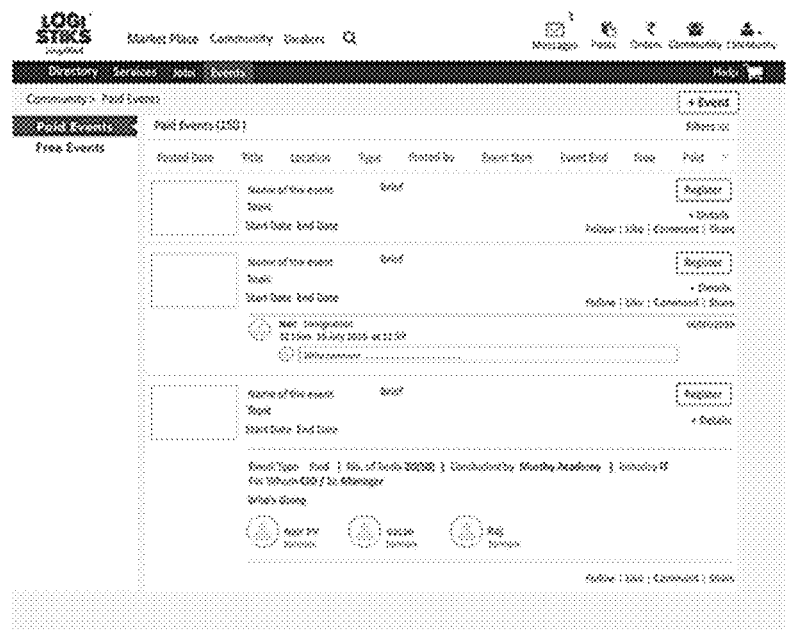
Figure 60:
Figure 61:
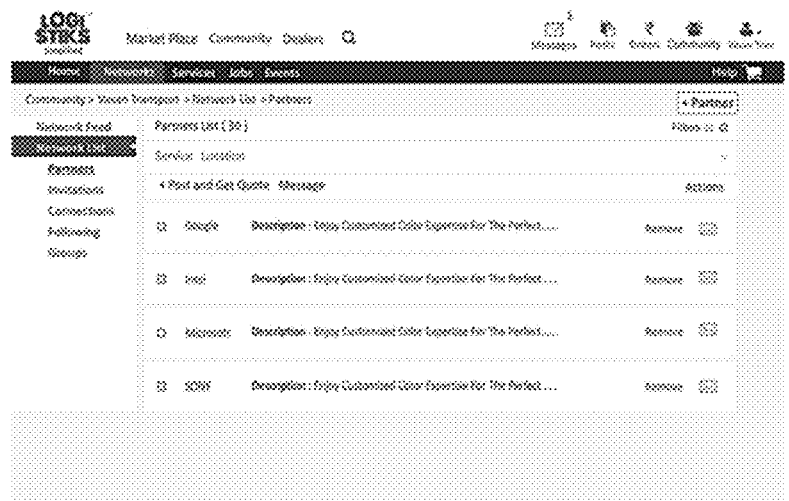
Figure 62:
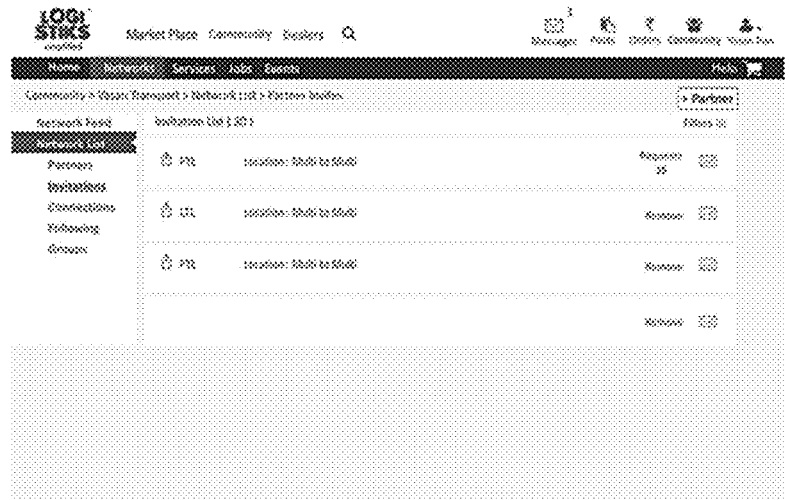
Figure 63:
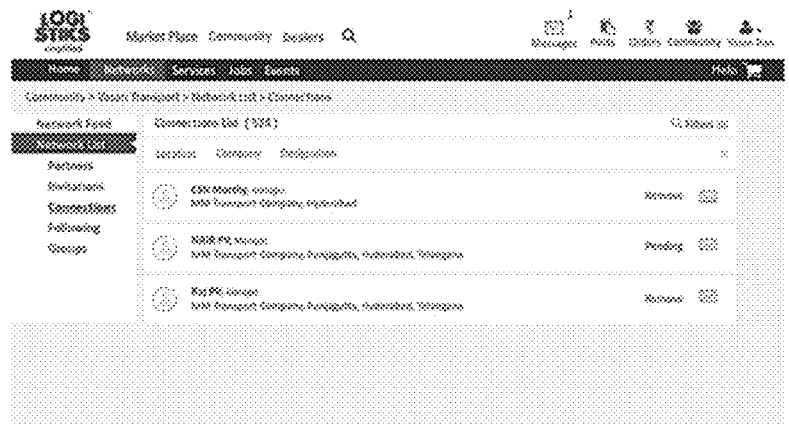
Figure 64:
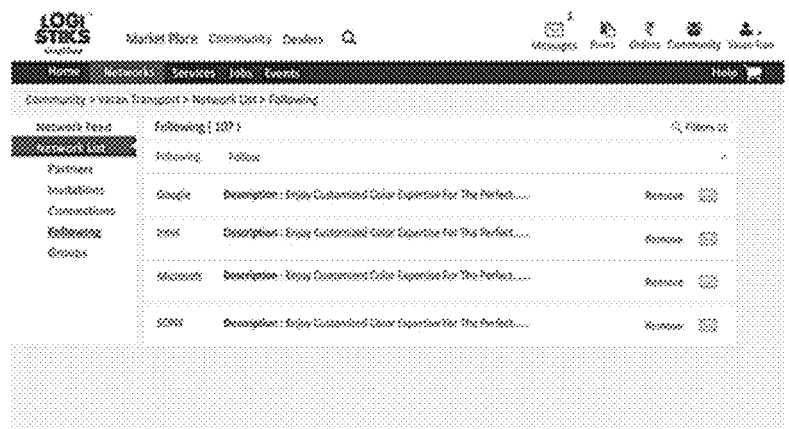
Figure 65:
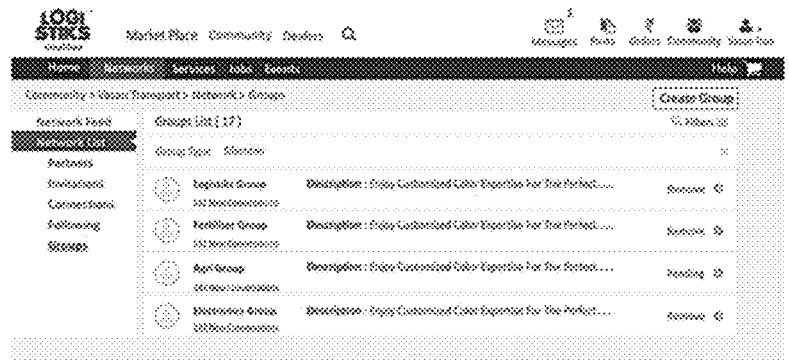
Figure 66:
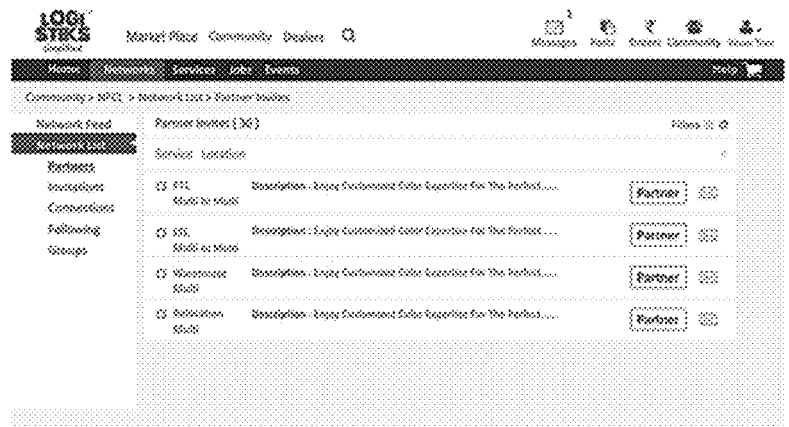
Figure 67:
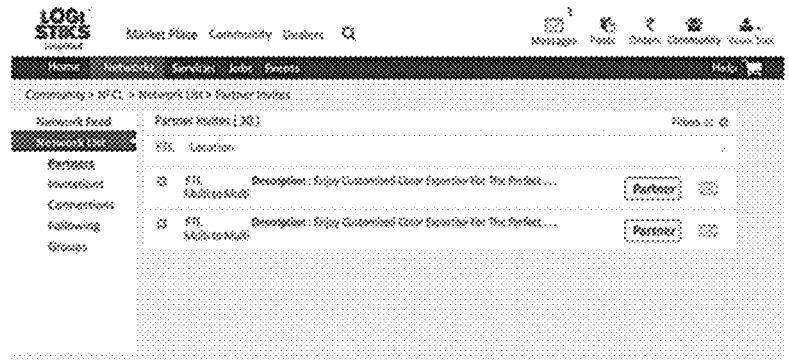
Figure 68:
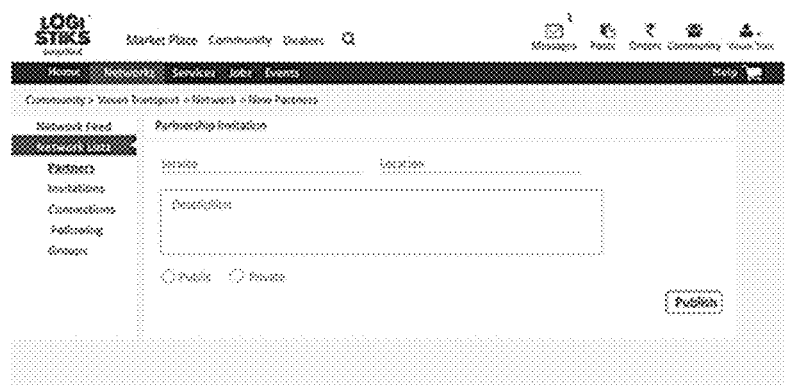
Figure 69:
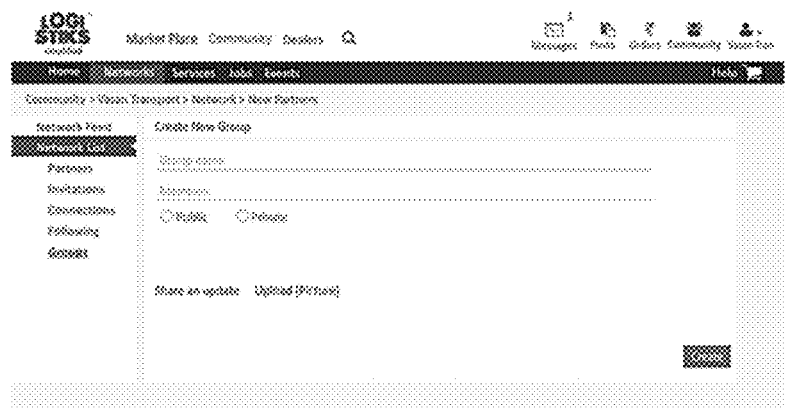
Figure 70:
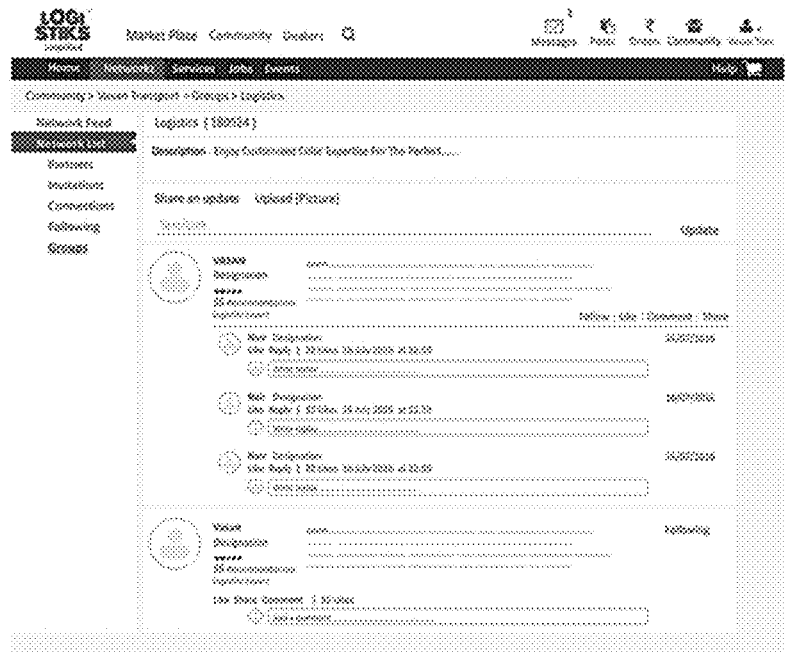
Figure 71:
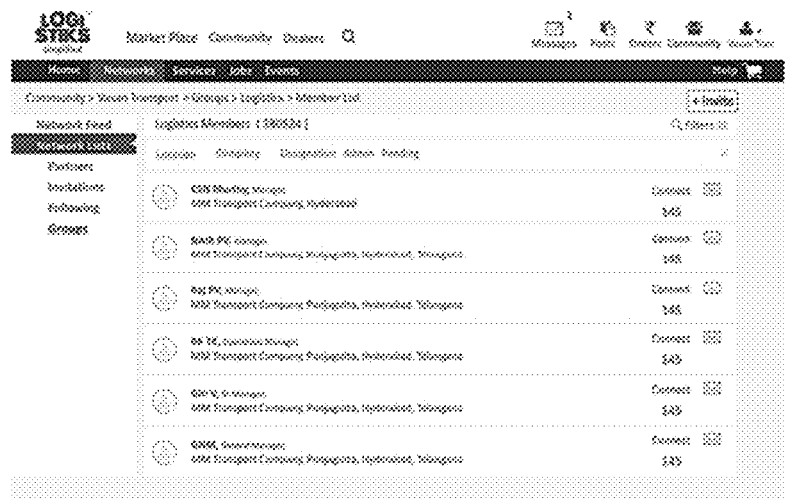
Figure 72:
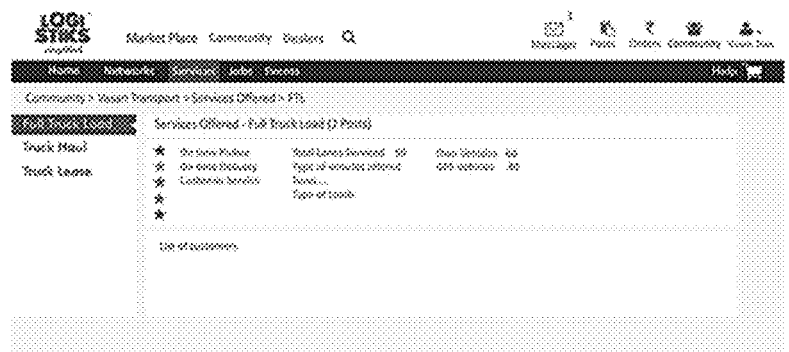
Figure 73:
Figure 74:
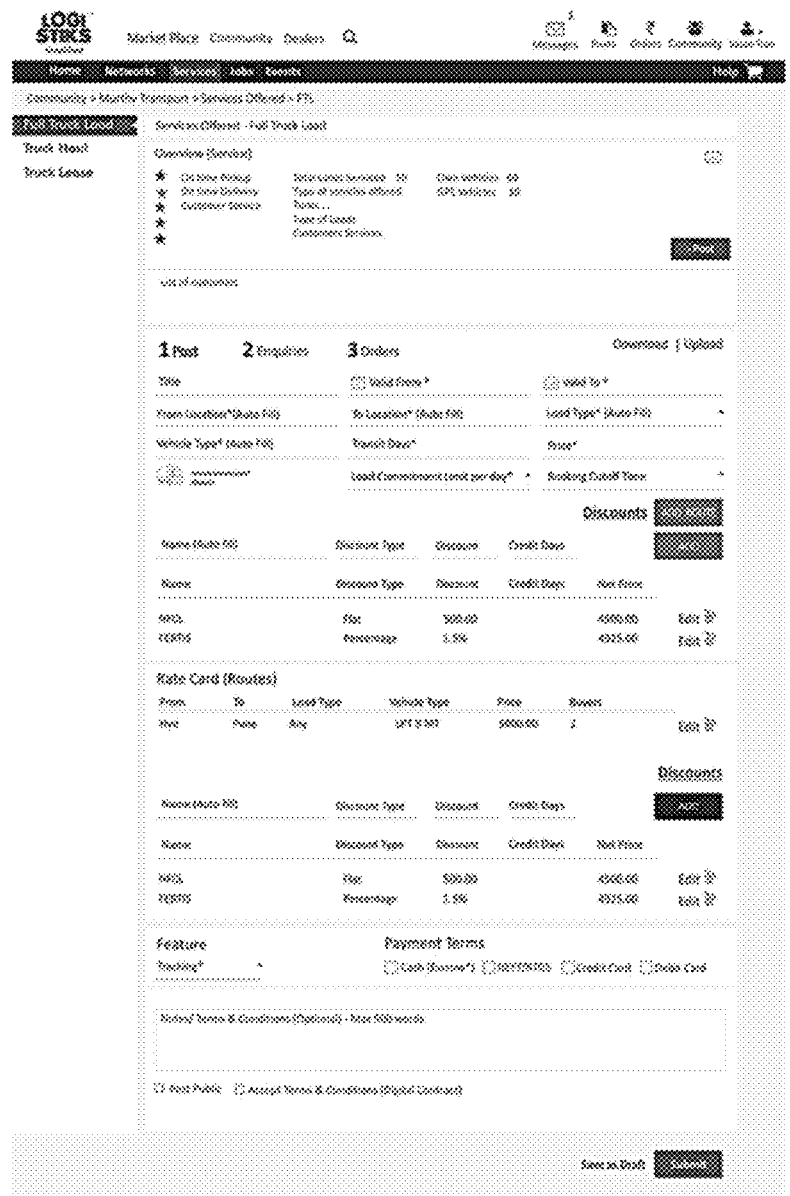
Figure 75:
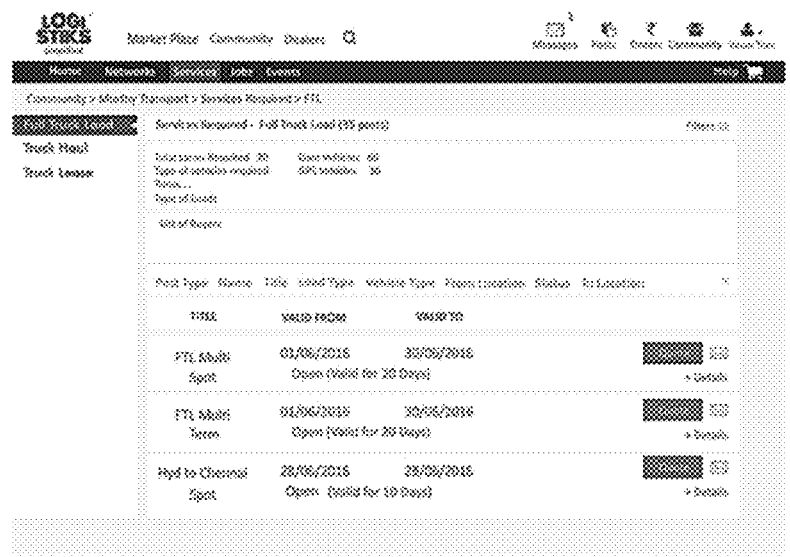
Figure 76:
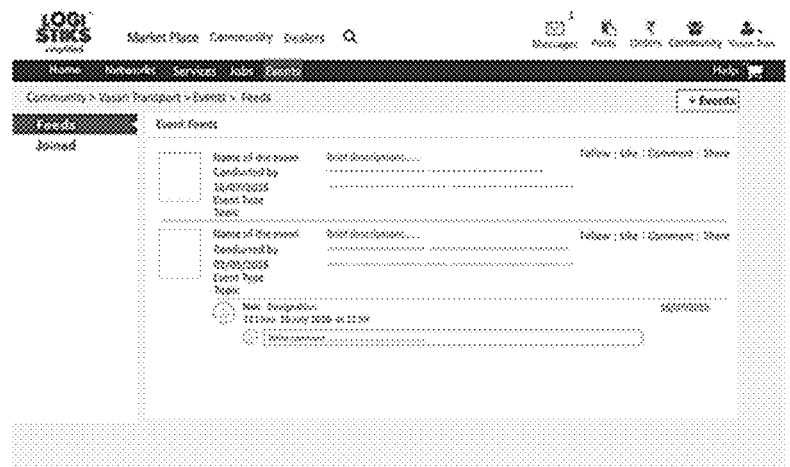
Figure 77:
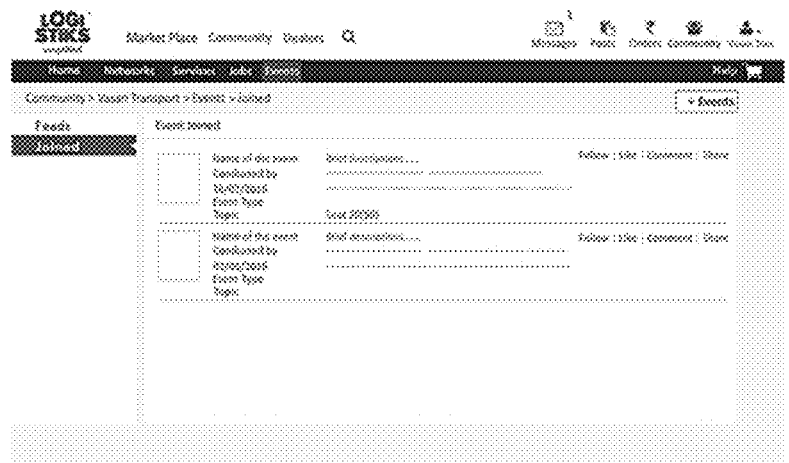
Figure 78:
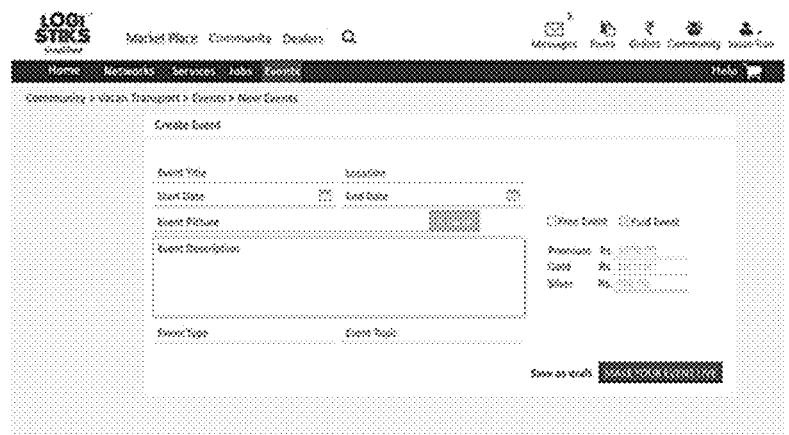
Figure 79:
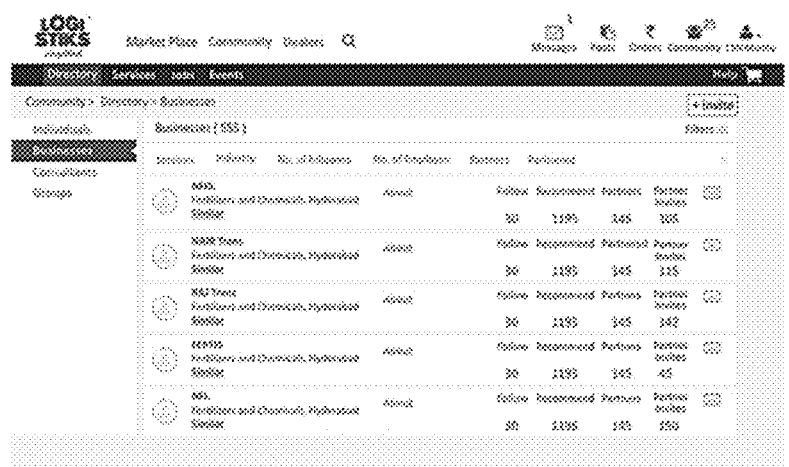
Figure 80:
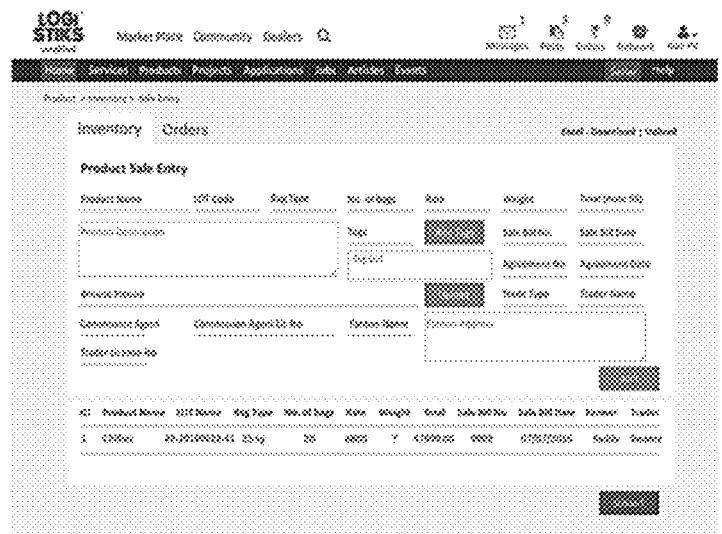
FIGS. 80-84 illustrates exemplary screenshots displaying inventory management pages in accordance with one embodiment of the present disclosure.
Figure 81:
Figure 82:
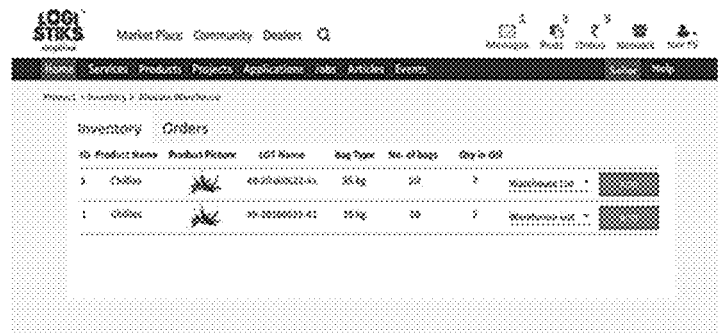
Figure 83:
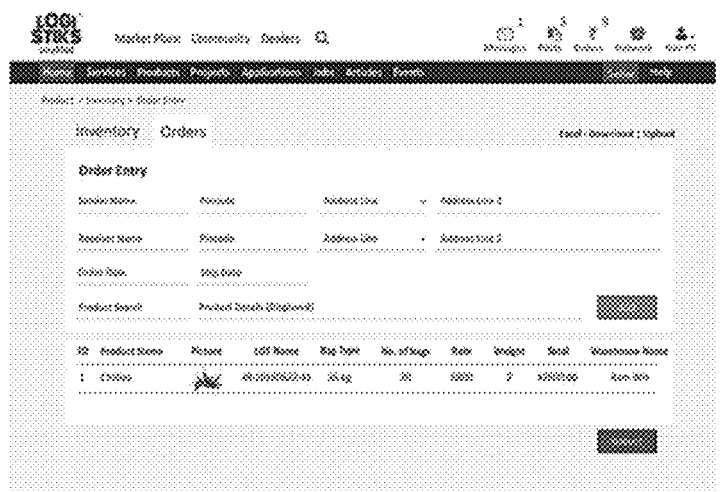
Figure 84:
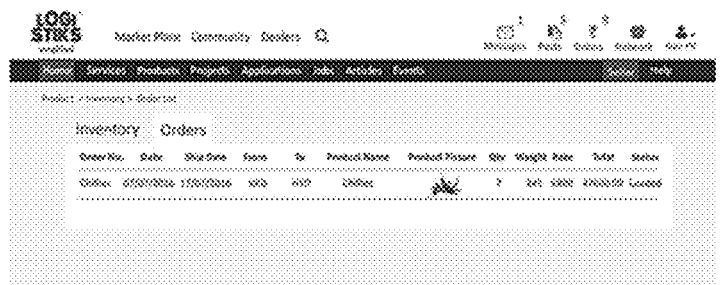
Figure 85:
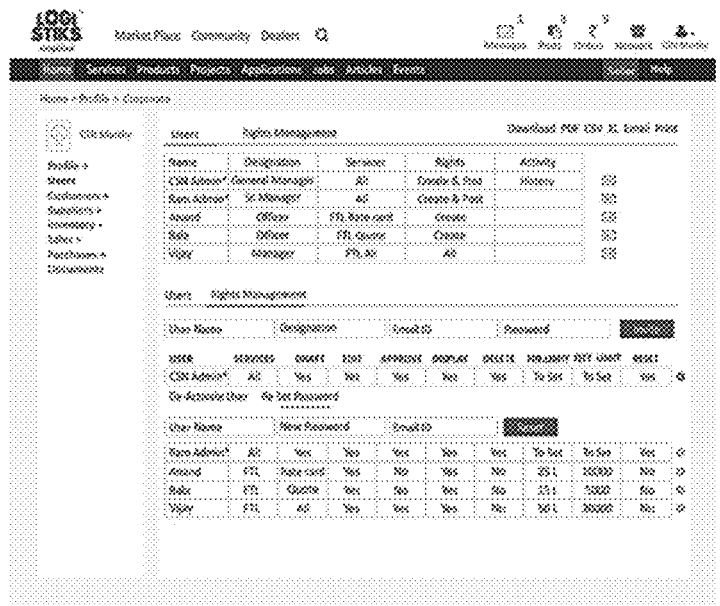
FIGS. 85-88 illustrates exemplary screenshots displaying roles and report pages of users in accordance with one embodiment of the present disclosure.
Figure 86:
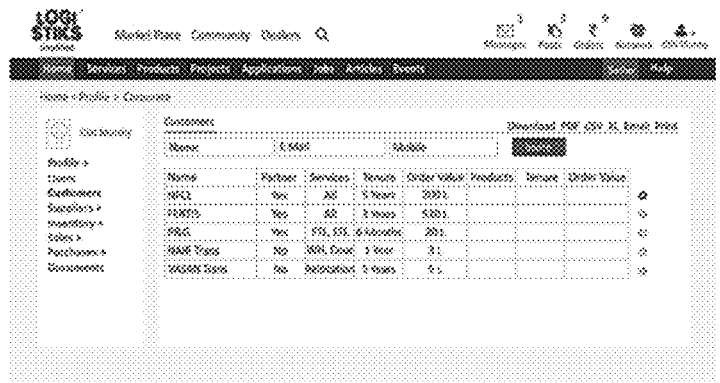
Figure 87:
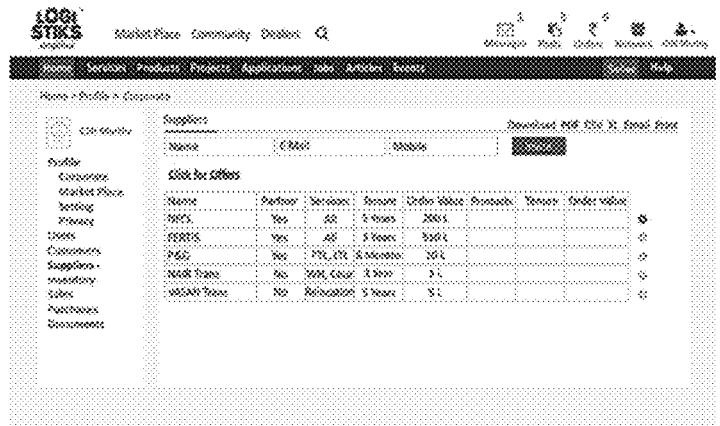
Figure 88:
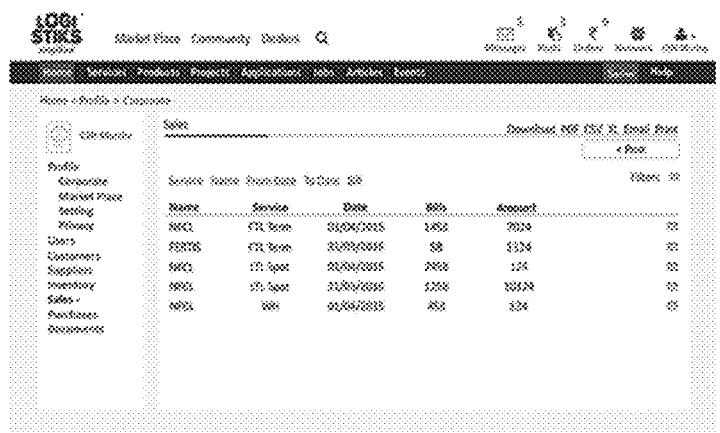

The order and transaction management module 306 is configured to receive, place and cancel orders 410 and transactions 412, to create indents, invoices, and to update order status, to assign inventory associated with the orders and transactions. FIG. 24 illustrate the list of order messages made by the seller after posting. Further, the order and transaction management module 306 is configured to view the orders 410 comprising single and multiple orders 410 and transactions 412, to categorize, group and sort the orders and transactions by the plurality of values 210 sought and/or offered by the users and to search, sort and filter the orders 410 and transactions 412. FIGS. 40-42 illustrate the buyer's cart, order payment page, and order confirmation, order master page and post messages respectively. FIGS. 43 and 44 illustrate exemplary screenshot of buyer's order master page and order post messages. Upon placing orders and transactions, the security of the transaction and data involved therein is implemented. In one embodiment, the transaction and data security management module 308 enables secure financial transactions between the nodes 106. The transaction and data security management module 308 is further configured to enable security to data generated during and post financial transactions and real time interactions. Example of the one or more real time interactions include but not limited to financial transactions, non-financial transactions, trading, buying, selling and/or offering, messaging.

As illustrated in FIGS. 80-84, the inventory management module 312 is configured to update inventory databases comprising one or more records related to product stored in the value network repository, wherein each records of the inventory database comprises a product id, product name, package type, count of packages, rate of each package, total weight of the product, invoice number, invoice date, name of the buyer and seller associated with the product. The transaction data management module 310 enables storing and updating of transaction related data in a value network repository 104. The insurance module 314 is configured to enable necessary insurance for the transaction thus ordered.

The data storage module 220 is configured to store, update, segregate, access, manage, analyse, filter, sort data available via each node and the plurality of real time interactions, and to allow upload and data integration with third-party applications including the application store module 224, accounting and Enterprise Resource Planning systems in real time and to upload related documents. The application store module 224 is configured to manage and update one or more third-party applications configured to enable value creation, optimization and value delivery. The communication module 222 is configured to enable the one or more nodes 106 to communicate with each other through at least one of messaging, email, Voice Over IP and telephony.

The VNNMS 102 also comprises a business rule engine or the processor 110, the business rule repository 120 coupled with the business rule engine and configured to store the plurality of business rules 122 associated with the plurality of values 210. The business rule engine is configured to receive one or more real time interactions between at least two nodes for a plurality of values sought/offered and determine a corresponding business rule from among the plurality of business rules 122. Upon determination, the processor 110 executes the business rule thus determined and modify the plurality of values 210 based on execution.

The value enhancement module 226 is coupled with the business rule repository 120, and configured to receive one or more real time interactions between at least two nodes 106 for a plurality of values 210 sought/offered and dynamically determine a previously stored plurality of real time interactions relevant to the one or more real time interactions thus received. The value enhancement module 226 also identifies a business rule from the business rule repository 120 corresponding to the one or more real time interactions and relevant real time interactions thus determined, execute the business rule thus identified and modify the plurality of values 210 based on the execution.

In a further embodiment, the customer may make an enquiry on a service offered based on market place analytics information. The analytics module 230 provides the basic analytics information, for example, includes cost/mile, on-time pickup and delivery, and realizing higher asset utilization. Advanced analytics helps the Customer as a decision support in for example, Carrier Sourcing, Network Design and Optimization, Fleet Sizing, Load Planning, Network Visibility and Freight Payment etc. Analytics for network redesign, key network metrics help in network optimization. Analytics for Mode Shift, Aggregation & Route Optimization may help customer reduce the cost. For example, if a supplier is due for truck placement, the system alerts the Supplier for truck placement. If he misses his scheduled placement of truck, the BI tool alerts Customer to take action, such as using alternate vendor, other mode if delivery time is important etc.

The VNNMS 102 also provides Predictive Analysis done using data to better predict what may happen next in the supply chain. Examples include forecasting future demand patterns based on past demand patterns; using data to estimate rates on various transportation lanes; and provide decision support to Customers. In one example, the VNNMS 102 captures the information during transactions including Type of Service Availed, Buyer of Service, Seller of Service, Performance as measured by KPIs, Rating of Service, Cost of Service Provided, Time taken to provide the service. In case of Transportation, the VNNMS captures the information such as Lane Serviced, type of Vehicle Used/Warehouse Used, Distance Travelled, Location Detail, Date/Time of Availing Service, Type of Product handled or transported, Volume of business handled, Pricing Type, Nature of Post—Public or Private and Other parameters. The analytics module 230 processes the above information and provides market place analysis information that may help the customers to take decision in real time.

FIGS. 45-79 illustrates screenshots of community page where a member of a community is an individual member, a group and an organization. The community module 316 creates a community, enables search for an individual/group/organization members and manage the community. The community module 316 enables the community member to follow or partner with another member. Further, the community module 316 enables the community member to recommend or share profile of another community member, send or receive messages and view contact information of community members within the group. A community member may also explore business opportunities with another member in his network. The VNNMS 102 further comprises a single and multiple dashboard interfaces to display information associated with each node, comprising user profile 208 and the plurality of values 210 associated with the node, and dynamically display notifications of the real time interactions between the nodes 106.

Thus, the VNNMS 102 provides online support to customers or buyers and sellers in a real-time shared environment and enables value creation, optimization and value delivery. End-to-end approach delivers guaranteed realized savings to group of customers forming the network. The network of customers can be managed and expanded globally.

As described above, the modules 206, amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 208 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer system to facilitate creation and management of a real time digital value nodes and networks, said system comprising:
    a node creation and management module, configured to create one or more nodes, each node representing a user and comprises at least a user profile and a plurality of values associated with the user;
    a value network creation and management module, configured to create a real time digital value network by generating a plurality of real time interactions and connections, each connecting one or more nodes, wherein the node to be connected with other nodes and interactions is determined based on at least the user profile and the corresponding plurality of values of the one or more nodes;
    a dealer module configured to enable external users to create, verify, edit and modify the one or more nodes, enables the plurality of real time interactions and connections for the one or more nodes;
    a digital value node and network management module is configured to enable view, and manage the one or more nodes, the plurality of real time interactions and connections of the one or more nodes; and
    a value enhancement module configured to:
    receive one or more real time interactions between at least two nodes for a plurality of values sought/offered;
    dynamically determine a previously stored plurality of real time interactions relevant to the one or more real time interactions thus received;
    identify a business rule from a business rule repository corresponding to the one or more real time interactions and relevant real time interactions thus determined;
    execute the business rule thus identified; and
    modify the plurality of values based on the execution, wherein the plurality of values comprises information associated with a value sought or offered and includes one of the form of a service, product, project, job, article, event, recommendation, third-party software applications, insurance, finance, and rating, wherein plurality of values is shared with the one or more nodes.

2. The computer system as claimed in claim 1, further comprises a market feeds module configured to provide information associated with the plurality of values to enable creation of the one or more nodes and the plurality of interactions between the one or more nodes.

3. The computer system as claimed in claim 1, wherein the user is at least one of an individual, organization, and a group, wherein the group is selected from one of a group of individuals, and a group of organizations and combinations thereof.

4. The computer system as claimed in claim 1, wherein the node creation and management module is further configured to:
    a. create a plurality of posts, each post comprises information associated with the plurality of values that are sought and offered by each of the nodes;
    b. group one or more similar posts based on the plurality of values associated with the one or more posts prior to creating the plurality of posts; and
    c. dynamically group the one or more posts based on the plurality of values currently associated with the one or more posts upon creating the plurality of posts.

5. The computer system as claimed in claim 1, wherein the node creation and management module is further configured to:
    a. create the plurality of connections between two nodes including a user and a group or organization to enable the user to be part of the group or organization; and
    b. allocate at least one right to the one or more nodes, wherein the at least one right include information associated with right to post, to edit, to order and transaction, limit on the number of posts, orders and transactions and other related rights.

6. The computer system as claimed in claim 1, wherein the plurality of connections is selected from one of follow, connect and partnership type of connections.

7. The computer system as claimed in claim 1, wherein the network creation and management module is further configured to:
    a. search, categorize, sort, filter and view the one or more nodes based on the user profile and the plurality of values associated with the one or more nodes;
    b. dynamically determine one or more nodes for connecting with at least one node based on the plurality of values and historical interactions associated with the at least one node;
    c. view and analyse the plurality of connections and one or more nodes connected via the plurality of connections; and
    d. delete existing plurality of connections between each or multiple nodes based on the user profile and the plurality of values associated with the one or more nodes.

8. The computer system as claimed in claim 7, wherein the engagement module comprises a plurality of tools to perform one or more of the following steps:
  a. to categorize, search and filter the one or more nodes based on the plurality of values to enable creation of the one or more nodes and the plurality of interactions between the one or more nodes;
  b. to receive the plurality of responses associated with the plurality of values from the at least one node based on search results of step (a);
  c. to display and manage the plurality of responses, quotes, messages, notifications, leads, market analytics, offers and documentation provided by at least one selected node, wherein the list of responses includes one or more of related, unrelated, and partly related responses associated with the value requirements of the selected node; and
  d. to select and create one or more agreements with the one or more nodes based on at least one of the plurality of responses and the plurality of values sought or offered.

9. The computer system as claimed in claim 7, wherein the agreement module includes tools:
  a. to view one or more agreements, wherein each node is associated with a single or multiple agreements;
  b. to categorize and group the one or more agreements based on the plurality of values;
  c. to categorize, sort, and filter the one or more agreements;
  d. to enable sharing of the one or more agreements with the one or more nodes through messaging, email, and other communication tools; and
  e. to receive and send notifications in relation to the one or more agreements.

10. The computer system as claimed in claim 7, wherein the order and transaction management module comprise a plurality of tools configured:
  a. to receive, place and cancel orders and transactions, to create indents, invoices, and to update order status, to assign inventory associated with the orders and transactions;
  b. to view the orders comprising single and multiple orders and transactions;
  c. to categorize, group and sort the orders and transactions by the plurality of values sought and/or offered by the users; and
  d. to search, sort and filter the orders and transactions.

11. The computer system as claimed in claim 1, wherein the network creation and management module further comprises one or more modules for creating and managing the one or more real time interactions including:
  a. an engagement module configured to categorize, search and view the one or more nodes, and to assist in filtering, and sorting of the one or more nodes through the search results and to enable interactions and connections between the two or more nodes based on searching;
  b. an agreement module to manage one or more agreements between the one or more nodes for seeking or offering the plurality of values;
  c. an order and transaction management module to manage orders and transactions based on the agreements between the one or more nodes;
  d. an inventory management module to enable purchase and rental of one or more inventory products within the one or more nodes and external nodes;
  e. a transaction and data security management module to enable secure financial transactions between the one or more nodes; and
  f. a transaction data management module to enable storing and updating of transaction related data in a value network repository coupled with the system.

12. The computer system as claimed in claim 1, wherein the inventory management module is configured to update inventory databases comprising one or more records related to product stored in the value network repository, wherein each records of the inventory database comprises a product id, product name, package type, count of packages, rate of each package, total weight of the product, invoice number, invoice date, name of the buyer and seller associated with the product.

13. The computer system as claimed in claim 1, wherein the transaction and data security management module is further configured to enable security to data generated during and post financial transactions and real time interactions.

14. The computer system as claimed in claim 1, wherein plurality of values is shared with the one or more nodes using tools including but not limited to create, post, edit, delete, track, browse, filter, list, view, exchange and use of the plurality of values.

15. The computer system as claimed in claim 1, wherein the one or more real time interactions include but not limited to financial transactions, non-financial transactions, trading, buying, selling and/or offering, messaging.

16. The computer system as claimed in claim 1, further comprises a communication module to enable the one or more nodes to communicate with each other through at least one of messaging, email, Voice Over IP and telephony.

17. The computer system as claimed in claim 16, further comprises a data storage module to store, update, segregate, access, manage, analyse, filter, sort data available via each node and the plurality of real time interactions; and to allow upload and data integration with third-party applications including the application store module, accounting and Enterprise Resource Planning systems in real time and to upload related documents.

18. The computer system as claimed in claim 1, further comprises one or more modules including an application store module to manage and update one or more third-party applications configured to enable value creation, optimization and value delivery.

19. The computer system as claimed in claim 1, further comprises a single and multiple dashboard interfaces to display information associated with each node, comprising user profile and the plurality of values associated with the node, and dynamically display notifications of the real time interactions between the one or more nodes.

20. The computer system as claimed in claim 1, further comprises a business rule engine, a business rule repository coupled with the business rule engine and configured to store a plurality of business rules associated with the plurality of values, wherein the business rule engine is configured to:
  a. receive one or more real time interactions between at least two nodes for a plurality of values sought/offered;
  b. determine a corresponding business rule from among the plurality of business rules stored in the business rule repository;
  c. execute the business rule thus determined; and
  d. modify the plurality of values based on execution.

21. A method for facilitating creation and management of a real time digital value nodes and networks, said method comprising:
- creating one or more nodes, by a node creation and management module, each node representing a user and comprises at least a user profile and a plurality of values associated with the user;
- creating a real time digital value network, by a value network creation and management module, by generating a plurality of real time interactions and connections, each connecting one or more nodes, wherein the node to be connected with other nodes and interactions is based on at least the user profile and the corresponding plurality of values of the one or more nodes;
- enabling external users, by a dealer module, to create, verify, edit and modify the user profile and the plurality of values of the users, and to enable actions like post, order, transact, and manage the plurality of real time interactions and connections for the user;
- receiving, by a value enhancement module, one or more real time interactions between at least two nodes for a plurality of values sought/offered;
- dynamically, by the value enhancement module, determine a previously stored plurality of real time interactions relevant to the one or more real time interactions thus received;
- identifying, by the value enhancement module, a business rule from a business rule repository corresponding to the one or more real time interactions and relevant real time interactions thus determined;
- executing, by the value enhancement module, the business rule thus identified; and
- modifying, by the value enhancement module, the plurality of values based on the execution, wherein the plurality of values comprises information associated with a value sought or offered and includes one of the form of a service, product, project, job, article, event, recommendation, third-party software applications, insurance, finance, and rating, wherein plurality of values is shared with the one or more nodes.

22. The method as claimed in claim 21, further comprising providing information associated with the plurality of values to enable creation of the one or more nodes and the plurality of interactions between the one or more nodes.

23. The method as claimed in claim 21, wherein the user is at least one of an individual, organization, and a group, wherein the group is selected from one of a group of individual, and a group of organization and combinations thereof.

* * * * *